United States Patent
Hidaka et al.

(10) Patent No.: US 8,625,615 B2
(45) Date of Patent: Jan. 7, 2014

(54) PCI EXPRESS SWITCH, PCI EXPRESS SYSTEM, AND NETWORK CONTROL METHOD

(75) Inventors: Youichi Hidaka, Tokyo (JP); Takashi Yoshikawa, Tokyo (JP); Junichi Higuchi, Tokyo (JP); Jun Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 213 days.

(21) Appl. No.: 12/992,164

(22) PCT Filed: May 18, 2009

(86) PCT No.: PCT/JP2009/059125
§ 371 (c)(1),
(2), (4) Date: Nov. 11, 2010

(87) PCT Pub. No.: WO2009/139489
PCT Pub. Date: Nov. 19, 2009

(65) Prior Publication Data
US 2011/0064089 A1   Mar. 17, 2011

(30) Foreign Application Priority Data
May 16, 2008   (JP) .................... 2008-129157

(51) Int. Cl.
*H04L 12/28* (2006.01)
*H04L 12/56* (2011.01)

(52) U.S. Cl.
USPC ........................................... 370/401

(58) Field of Classification Search
None
See application file for complete search history.

(56) References Cited

U.S. PATENT DOCUMENTS

| | | | |
|---|---|---|---|
| 7,743,189 B2* | 6/2010 | Brown et al. | 710/104 |
| 7,743,197 B2* | 6/2010 | Chavan et al. | 710/314 |
| 8,103,810 B2* | 1/2012 | Brown et al. | 710/62 |

FOREIGN PATENT DOCUMENTS

| | | |
|---|---|---|
| JP | 10-210069 A | 8/1998 |
| JP | 2005250975 A | 9/2005 |
| JP | 2005317021 A | 11/2005 |
| JP | 2007067738 A | 3/2007 |
| JP | 2007241526 A | 9/2007 |
| JP | 2008046722 A | 2/2008 |
| JP | 2008078887 A | 4/2008 |
| JP | 2008171413 A | 7/2008 |
| WO | 2009054525 A | 4/2009 |

OTHER PUBLICATIONS

Multi-Root I/O Virtualization and Sharing, Revision 0.9, mr-Iov-09-2007-11-07.doc, PCISIG, Nov. 7, 2007, pp. 15-33.
J. Suzuki et al., "ExpressEther—Ethernet-Based Virtualization Technology for Reconfigurable Hardware Platform", Proceedings of the 14th IEEE Symposium on High-Performance Interconnects, Aug. 2006.

* cited by examiner

*Primary Examiner* — Ayaz Sheikh
*Assistant Examiner* — Blanche Wong

(57) ABSTRACT

Provided are a first PCI-PCI bridge that handles Multi Root to connect to a plurality of root complexes; a second PCI-PCI bridge that connects to an endpoint; a virtual PCI Express switch that performs a switching process between the first and second PCI-PCI bridges; and a network control device that transfers data that is to be processed in the virtual PCI Express switch to an external switch through a network without passing through a PCI-PCI bridge.

17 Claims, 33 Drawing Sheets

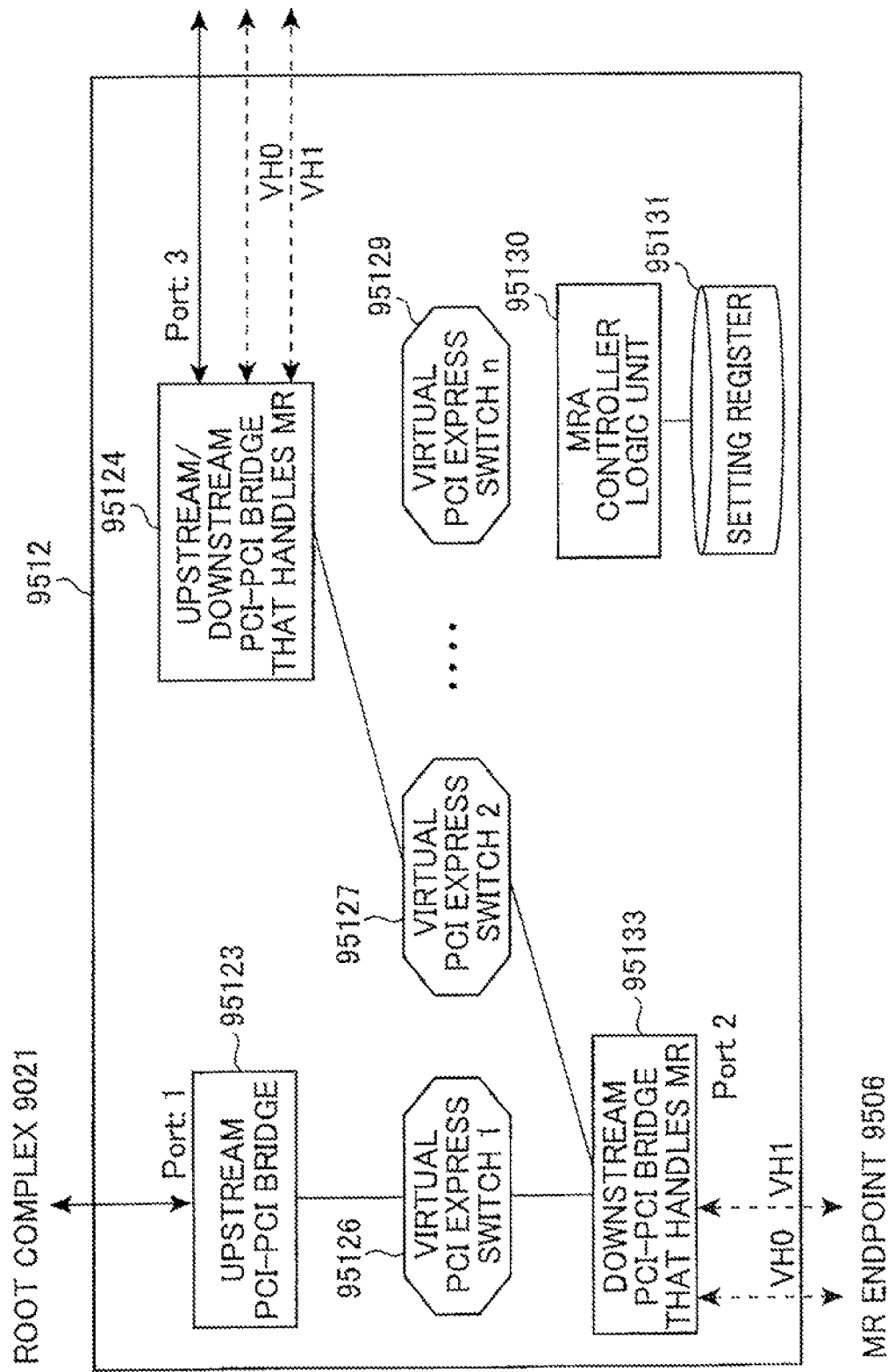

FIG.8

SETTING REGISTER

| VIRTUAL PCI EXPRESS SWITCH NUMBER | SWITCH UTILIZATION PORT NUMBER, UTILIZATION VH NUMBER AND UP/DN SETTING | SWITCH UTILIZATION PORT NUMBER, UTILIZATION VH NUMBER AND UP/DN SETTING | SWITCH UTILIZATION PORT NUMBER, UTILIZATION VH NUMBER AND UP/DN SETTING | SWITCH UTILIZATION PORT NUMBER, UTILIZATION VH NUMBER AND UP/DN SETTING | ... | SWITCH UTILIZATION PORT NUMBER, UTILIZATION VH NUMBER AND UP/DN SETTING |
|---|---|---|---|---|---|---|
| 1 | Port1,VH0,UP | Port3,VH0,DN | Port4,N/A,DN | Port6,VH0,DN | | |
| 2 | Port2,N/A,UP | Port3,VH1,DN | Port5,N/A,DN | | | |
| 3 | Port6,VH1,UP | Port3,VH2,DN | | | | |
| ⋯ | | | | | | |
| n | | | | | | |

SETTING REGISTER

| VIRTUAL PCI EXPRESS SWITCH NUMBER | SWITCH UTILIZATION PORT NUMBER, UTILIZATION VH NUMBER AND UP/DN SETTING | SWITCH UTILIZATION PORT NUMBER, UTILIZATION VH NUMBER AND UP/DN SETTING | SWITCH UTILIZATION PORT NUMBER, UTILIZATION VH NUMBER AND UP/DN SETTING | SWITCH UTILIZATION PORT NUMBER, UTILIZATION VH NUMBER AND UP/DN SETTING | ... | SWITCH UTILIZATION PORT NUMBER, UTILIZATION VH NUMBER AND UP/DN SETTING |
|---|---|---|---|---|---|---|
| 1 | Port1,N/A,UP | Port2,VH1,DN | Port3,VH1,DN | | | |
| 2 | Port2,VH0,DN | Port3,VH0,UP | | | | |
| 3 | | | | | | |
| .... | | | | | | |
| n | | | | | | |

95131

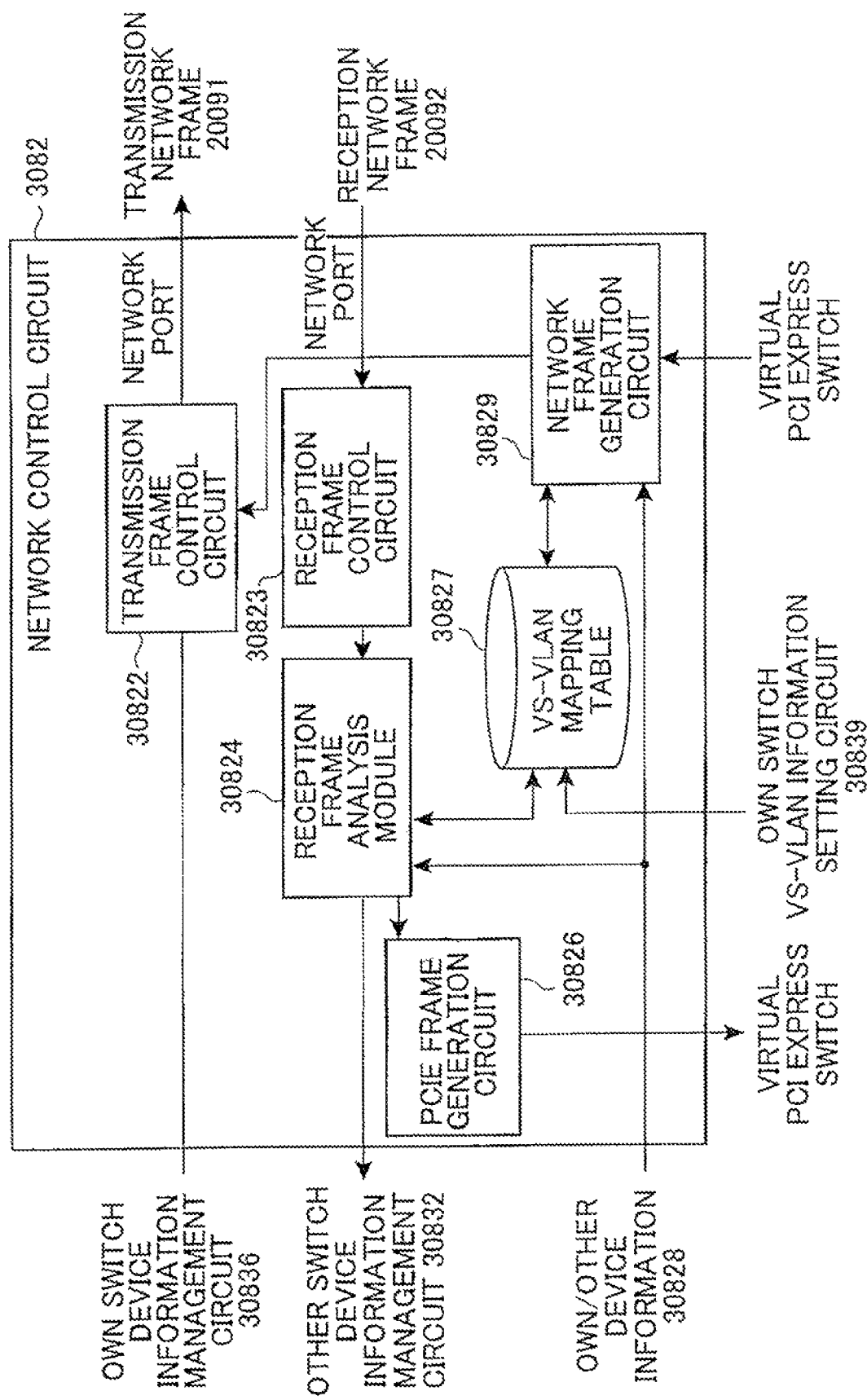

FIG.17

SETTING REGISTER

| VIRTUAL PCI EXPRESS SWITCH NUMBER | SWITCH UTILIZATION PORT NUMBER, UTILIZATION VH NUMBER AND UP/DN SETTING | SWITCH UTILIZATION PORT NUMBER, UTILIZATION VH NUMBER AND UP/DN SETTING | SWITCH UTILIZATION PORT NUMBER, UTILIZATION VH NUMBER AND UP/DN SETTING | ... | SWITCH UTILIZATION PORT NUMBER, UTILIZATION VH NUMBER AND UP/DN SETTING |
|---|---|---|---|---|---|
| 1 | Port1,VH0,UP | Port3,VH0,DN | Port4,N/A,DN | | |
| 2 | Port2,N/A,UP | Port3,VH1,DN | Port5,N/A,DN | | |
| 3 | Port3,VH2,DN | | | | |
| .... | | | | | |
| n | | | | | |

SETTING REGISTER

| VIRTUAL PCI EXPRESS SWITCH NUMBER | SWITCH UTILIZATION PORT NUMBER, UTILIZATION VH NUMBER AND UP/DN SETTING | SWITCH UTILIZATION PORT NUMBER, UTILIZATION VH NUMBER AND UP/DN SETTING | SWITCH UTILIZATION PORT NUMBER, UTILIZATION VH NUMBER AND UP/DN SETTING | ... | SWITCH UTILIZATION PORT NUMBER, UTILIZATION VH NUMBER AND UP/DN SETTING |
|---|---|---|---|---|---|
| 1 | Port1,N/A,UP | Port2,VH1,DN | | | |
| 2 | Port2,VH0,DN | | | | |
| 3 | | | | | |
| .... | | | | | |
| n | | | | | |

VS-VLAN MAPPING TABLE

| VIRTUAL PCI EXPRESS SWITCH NUMBER | UTILIZATION VLAN NUMBER |
|---|---|
| 1 | 1 |
| 2 | 2 |
| 3 | 2003 |
| ⋮ | |
| n | V |

VS-VLAN MAPPING TABLE

| VIRTUAL PCI EXPRESS SWITCH NUMBER | UTILIZATION VLAN NUMBER |
|---|---|
| 1 | 2003 |
| 2 | 1 |
| ⋮ | |
| n | V |

OWN SWITCH DEVICE INFORMATION TABLE

| SWITCH UTILIZATION MAC ADDRESS |
|---|
| 00-00-4c-01-00-00 |

OWN SWITCH DEVICE INFORMATION TABLE 30838-2

| VIRTUAL PCI EXPRESS SWITCH NUMBER | SWITCH UTILIZATION PORT NUMBER, UTILIZATION VH NUMBER AND UP/DN SETTING | UTILIZATION MAC ADDRESS |
|---|---|---|
| 1 | Port1,VH0,UP | 00-00-4c-01-01-01 |
| 1 | Port3,VH0,DN | 00-00-4c-01-01-02 |
| 1 | Port4,N/A,DN | 00-00-4c-01-01-03 |
| 2 | Port2,N/A,UP | 00-00-4c-01-02-01 |
| 2 | Port3,VH1,DN | 00-00-4c-01-02-02 |
| 2 | Port5,N/A,DN | 00-00-4c-01-02-03 |
| 3 | Port3,VH2,DN | 00-00-4c-01-03-02 |
| ... | ... | ... |
| n | | |

FIG.25

OTHER SWITCH DEVICE INFORMATION TABLE

| SWITCH | DISTINATION SWITCH MAC ADDRESS |
|---|---|
| 1 | 00-00-4c-02-00-00 |
| ⋮ | ⋮ |
| n | ⋮ |

OTHER SWITCH DEVICE INFORMATION TABLE — 30833-2

| VIRTUAL PCI EXPRESS SWITCH NUMBER | SWITCH UTILIZATION PORT NUMBER, UTILIZATION VH NUMBER AND UP/DN SETTING | UTILIZATION MAC ADDRESS |
|---|---|---|
| 2 | Port1,N/A,UP | 00-00-4c-02-01-01 |
| 2 | Port2,VH1,DN | 00-00-4c-02-01-02 |
| 1 | Port2,VH0,DN | 00-00-4c-02-02-01 |
| ... | ... | ... |
| n | | |

FIG.27

OWN SWITCH DEVICE INFORMATION TABLE

| SWITCH UTILIZATION MAC ADDRESS | 30838-51 |
|---|---|
| 00-00-4c-02-00-00 | |

FIG.28

OWN SWITCH DEVICE INFORMATION TABLE ~30838-52

| VIRTUAL PCI EXPRESS SWITCH NUMBER | SWITCH UTILIZATION PORT NUMBER, UTILIZATION VH NUMBER AND UP/DN SETTING | UTILIZATION MAC ADDRESS |
|---|---|---|
| 1 | Port1,VH1,UP | 00-00-4c-02-01-01 |
| 1 | Port2,VH1,DN | 00-00-4c-02-01-02 |
| 2 | Port1,VH0,DN | 00-00-4c-02-02-01 |
| ... | ... | ... |
| n | | |

FIG.29

OTHER SWITCH DEVICE INFORMATION TABLE

| SWITCH | DISTINATION SWITCH MAC ADDRESS |
|---|---|
| 1 | 00-00-4c-01-00-00 |
| ⋮ | ⋮ |
| n | ⋮ |

OTHER SWITCH DEVICE INFORMATION TABLE — 30833-52

| VIRTUAL PCI EXPRESS SWITCH NUMBER | SWITCH PORT 1: UTILIZATION PORT NUMBER, UTILIZATION VH NUMBER AND UP/DN SETTING | UTILIZATION MAC ADDRESS |
|---|---|---|
| 2 | Port1,VH0,UP | 00-00-4c-01-01-01 |
| 2 | Port3,VH0,DN | 00-00-4c-01-01-02 |
| 2 | Port4,N/A,DN | 00-00-4c-01-01-03 |
| 1 | Port3,VH2,DN | 00-00-4c-01-03-02 |
| ·· | ·· | ·· |
| n | | ·· |

PCI EXPRESS SWITCH, PCI EXPRESS SYSTEM, AND NETWORK CONTROL METHOD

The present application is the National Phase of PCT/JP2009/059125, filed May 18, 2009, which claims priority from Japanese Patent Application No. 2008-129157 filed on May 16, 2008, the entire contents of which being incorporated herein by reference.

TECHNICAL FIELD

The present invention relates to a PCI Express switch and a PCI Express system that extend PCI Express interfaces of a computing device and a networking device used in a computer and a network device. The present invention also relates to a network control method in the PCI Express system.

BACKGROUND ART

Peripheral Component Interconnect (PCI) is widely used as a bus standard for connecting computing devices, such as a central processing unit (CPU), hard disk device and graphic controller, and for connecting networking devices, such as a forwarding engine and network controller. PCI Express is standardized as a next-generation PCI standard: According to PCI Express, a parallel bus of PCI is turned into a serial one and communication takes place in a packet method.

FIG. 1 is a block diagram illustrating one example of the configuration of a computer system that uses PCI Express. As shown in FIG. 1, the computer system that uses PCI Express includes a CPU 901, a root complex 902, a memory 903, a PCI Express switch 904, and endpoints 905, 906 and 907.

The CPU 901 performs a central processing process of a computer. The root complex 902 is a root complex of the PCI Express mounted on a host bridge that controls the I/O access from the CPU 901. The memory 903 is connected to the host bridge. The PCI Express switch 904 is connected to the root complex 902. The endpoints 905, 906 and 907 are the endpoints of the PCI Express mounted on computing devices that is connected to the PCI Express switch 904.

As described above, in the computer system that uses PCI Express, there is only one root complex 902 to which the CPU 901 that manages a memory space of the PCI Express can be connected. Therefore, with the above configuration, it is not possible to form a system in which a device is shared by a plurality of computing systems.

FIG. 2 is a block diagram illustrating an example of the internal configuration of the PCI Express switch 904. As shown in FIG. 2, the PCI Express switch 904 includes an upstream PCI-PCI bridge 9041, which is connected in the direction of the root complex; and downstream PCI-PCI bridges 9042, 9043 and 9044, which are connected in the directions of the endpoints. The PCI-PCI bridges 9041, 9042, 9043 and 9044 are connected together through a PCI Express switch internal bus 9045.

For data transferred through the PCI Express system and the PCI Express switch internal bus 9045, a PCI Express frame is used: The PCI Express frame is managed on an address space of the CPU 901. In the downstream PCI-PCI bridges 9042, 9043 and 9044 connected to the upstream PCI-PCI bridge 9041 and the endpoints, only for the PCI Express frame corresponding to an address set by the CPU 901, data is transferred to the root complex 902 or the endpoints 905, 906 and 907.

As described above, in general, the PCI Express system has the structures of a frame transfer method and PCI express switch that are based on the assumption that there is only one CPU 901 on the system. Therefore, in the PCI Express system, with the above configuration, it is not possible to connect a plurality of CPUs on the system.

Therefore, a method of connecting a plurality of CPUs on a PCI Express system has been proposed. For example, what is disclosed in PTL1 is a method of connecting a plurality of CPUs on a system. FIG. 3 is a block diagram illustrating the configuration of a system that can be realized by the method disclosed in PTL1. FIG. 4 is a block diagram illustrating an example of the configuration of a settable PCI Express switch 111 disclosed in PTL1.

The PCI Express switch 904 shown in FIGS. 1 and 2 has one internal bus 9045 and one upstream PCI-PCI bridge 9041. On the other hand, the settable PCI Express switch 911 shown in FIGS. 3 and 4 includes a PCI Express switch internal bus 9116, which corresponds to an upstream PCI-PCI bridge 9111; and a PCI Express switch internal bus 9117, which corresponds to an upstream PCI-PCI bridge 9112. That is, the number of CPUs 901 and 908 being connected equals the number of internal buses 9116 and 9117 prepared, which correspond to the upstream PCI-PCI bridges 9111 and 9112. The connection relationship between the internal buses 9116 and 9117, a downstream PCI-PCI bridge 9113, a downstream PCI-PCI bridge 9114 and a downstream PCI-PCI bridge 9115 is controlled by a bridge controller logic 9118. With the above configuration, it is possible to connect a plurality of CPUs.

For example, what is disclosed in NPL1 is another method of connecting a plurality of CPUs on a system. FIG. 5 is a block diagram illustrating the configuration of a system that can be realized by the method disclosed in NPL1. FIGS. 6 and 7 are block diagrams each illustrating an example of the configuration of a MRA (Multi-Root Aware)-PCI Express switch disclosed in NPL1.

In a system that uses MRA-PCI Express switches, as shown in FIG. 5, it is necessary to put multi-root PCI manager software (MR-PCIM) 952 on any one of CPUs (which is a CPU 901 in the case of FIG. 5) that are connected to the switch. The MR-PCIM 952 manages the configuration state of the switch. It is also possible to connect I/O devices, such as MR endpoints 9505 and 9506, that handle access from a plurality of root complexes 902, 909 and 9021. The setting of the MRA-PCI Express switches is performed from the multi-root PCI manager software 952. Therefore, it is possible for a plurality of the root complexes 902, 909 and 9021 to connect. It is therefore possible for a plurality of the root complexes 902, 909 and 9021 to access devices of the MR endpoints 9505 and 9506. Incidentally, hereinafter, it may be explained that the MR-PCIM 952 executes. However, more specifically, the CPU 901 operates in accordance with the MR-PCIM 952, which is software.

The following describes the configuration of a MRA-PCI Express switch. Incidentally, what is shown in FIG. 5 as an example is the configuration of a system where two MRA-PCI Express switches are used. FIGS. 6 and 7 show the internal configuration of MRA-PCI Express switches 9511 and 9512.

The MRA-PCI Express switch 9511 includes PCI-PCI bridges 95111, 95112, 95122, 95113, 95114 and 95115, which are different from the PCI Express switch 904 shown in FIGS. 1 and 2, in order to accommodate a plurality of the root complexes 902 and 909 and the MR endpoint 9505. The MRA-PCI Express switch 9511 also includes virtual PCI Express switches 95116, 95117, 95118 and 95119, which perform a switching process between bridges; a MRA controller logic unit 95120, which is set and controlled by the MR-PCIM 952; and a setting register 95121, in which the setting information thereof is stored.

Similarly, another MRA-PCI Express switch 9512, which is provided to expand the number of connection ports, includes PCI-PCI bridges 95123, 95124 and 95133, which are different from the PCI Express switch 904 shown in FIGS. 1 and 2. The MRA-PCI Express switch 9512 also includes virtual PCI Express switches 95126, 95127 and 95129, which perform a switching process between bridges; a MRA controller logic unit 95130, which is set and controlled by the MR-PCIM 952; and a setting register 95131, in which the setting information thereof is stored.

CITATION LIST

Patent Literature

{PTL 1} JP-A-2005-317021 (Page 1, FIG. 3)

Non-Patent Literature

{NPL 1} Multi-Root I/O Virtualization and Sharing Specification Revision 0.9, PCI-SIG, Nov. 7, 2007, pp. 30

SUMMARY OF INVENTION

Technical Problem

When the configuration realized by the method disclosed in PTL1 is used, the buses inside the PCI Express switch 911 are completely separated. Therefore, during the operation, in terms of logic, the above is equivalent to the situation where there is a plurality of separate PCI Express systems, each shown in FIGS. 1 and 2. In order to increase the number of ports with the use of the PCI Express switch 911 that can be set, a tree of buses that are completely separated is formed by connecting the buses in a multi-stage structure in accordance with the PCI Express specifications.

When the method disclosed in NPL1 is used, a similar tree to that of the PCI Express shown in FIGS. 1 and 2 is formed for each of a plurality of root complexes 902, 909 and 9021 in the MRA-PCI Express switches 9511 and 9512. Therefore, as for which virtual PCI Express switch is used for each of the root complexes 902, 909 and 9021, it is necessary for VH numbers to be assigned in order to use a plurality of PCI-PCI bridges. Incidentally, in this case, a virtual PCI Express switch does not interfere with other virtual PCI Express switches because a switching process is performed for each virtual PCI Express switch.

In a PCI-PCI bridge that handles MR, a VH number is assigned, and it is taken into account that a plurality of PCI-PCI bridges is connected to one link. For different VH numbers, such operations as separating credit control and configuration information are performed, and a plurality of PCI-PCI bridge utilization numbers is displayed on one port.

The above setting is performed by the MR-PCIM 952 for the setting registers 95121 and 95131, which are control information of the MRA controller logic unit. Therefore, assignment is performed. FIGS. 8 and 9 are explanatory diagrams illustrating examples of the setting of the setting registers 95121 and 95131 of the MRA-PCI Express switches 9511 and 9512. In the example shown in FIGS. 5 to 7, the MR-PCIM 952 is connected to a port 1 (Port 1) that is close to the CPU 901 and the root complex 902.

The MRA-PCI Express switches 9511 and 9512 are MR-PCI-PCI bridges for the setting from the MR-PCIM 952 and use a path with a number of VH0.

The following describes the setting information of the setting registers 95121 and 95131. For each of the ports, the setting registers 95121 and 95131 store information used to form, for a virtual PCI Express switch number, a virtual PCI Express switch thereof, switch port utilization numbers, utilization VH numbers and UP/Down (DN) information representing whether the bridge is an upstream PCI-PCI bridge or downstream PCI-PCI bridge.

As shown in FIG. 8, in the setting register 95121, for the virtual PCI Express switch 95116 (Switch 1), in the switch number 1, "VH number: VH0: Upstream PCI-PCI bridge: UP" is set in the case of port 1 (Port 1). "VH0:DN" is set in the case of port 3 (Port 3). "No VH number: N/A (which is regarded as a typical PCIe port)" is set in the case of port 4 (Port 4). "VH0: DN" is set in the case of port 6 (Port 6). That is, in the example shown in FIG. 8, the setting information of the setting register 95121 enables the PCI-PCI bridge 95111 that handles MR, the virtual PCI Express switch 95116, the downstream PCI-PCI bridge 95113 that handles MR, the MR endpoint 9505, the downstream PCI-PCI bridge 95114, the endpoint 906 and the downstream PCI-PCI bridge 95122 that handles MR to be accessed from the root complex 902.

Moreover, the setting of the setting register 95131 of the MRA-PCI Express switch 9512 makes it possible to access beyond the downstream PCI-PCI bridge 95122. As shown in FIG. 9, in the setting register 95131, for the virtual PCI Express switch 95127 (Switch 2), "VH0: DN" is set in the case of port 2 (Port 2). "VH0:UP" is set in the case of port 3 (Port 3). Accordingly, beyond the downstream PCI-PCI bridge 95122 that handles MR, the following can be accessed from the root complex 902: the downstream PCI-PCI bridge 95124 that handles MR, the virtual PCI Express switch 95127 (Switch 2), the downstream PCI-PCI bridge 95133 that handles MR, and the MR endpoint 9506.

Similarly, the access ranges of the virtual PCI Express switch 95117 (Switch 2), the virtual PCI Express switch 95118 (Switch 3) and the virtual PCI Express switch 95126 (Switch 1) are set in the setting registers 95121 and 95131.

Thanks to the above setting, a PCI tree shown in FIG. 10 is assembled for the I/O device for the CPU 901. For the CPU 9011, a PCI tree shown in FIG. 11 is assembled. In FIGS. 10 and 11, I/O represents an I/O device, DN means "down", and P2P means "Peer to Peer."

In general, in order to connect one I/O device of PCI Express, one downstream PCI-PCI bridge is required. However, when a MRA-PCI Express switch is used, it is necessary to have a PCI-PCI bridge to connect switches. Therefore, even if there is one I/O device, an upstream PCI-PCI bridge and a downstream PCI-PCI bridge are uselessly connected. Therefore, the problem is that as the number of I/O devices increases, it takes more time to configure a PCI-PCI bridge and start the BIOS. The problem of the longer BIOS start time similarly arises with the settable PCI Express switch disclosed in PTL1.

When a MRA-PCI Express switch is used, another problem is that a VH number between switches needs to be set. Therefore, the MR-PCIM 952 needs to manage a connection link between switches for each root complex in addition to the number of I/O devices connected. Therefore, it takes more time to initialize the MR-PCIM 952. In this case, the MRA-PCI Express switch 9512 cannot perform the setting of a port at all that is connected to another root complex to which the MR-PCIM 952 is not connected until the initialization process (a process of examining the topology of switches and connected devices) is completed by the MR-PCIM 952. Therefore, as it takes more time to initialize, the operational performance of the system deteriorates significantly.

When the MR endpoint 9506 is accessed from the CPU 901, the upstream/downstream PCI-PCI bridge 95122 acts as a downstream PCI-PCI bridge. When the MR endpoint 9505 is accessed from the CPU 9011, the upstream/downstream PCI-PCI bridge 95122 needs to act as an upstream PCI-PCI bridge. Accordingly, the problem is that the circuit of the PCI-PCI bridge acting as an upstream or downstream bridge becomes more complicated, resulting in an increase in the size of the circuit. If there are two or more connection links between switches, there is a fear that a loop structure may be formed depending on the upstream or downstream setting of a connection position. Therefore, it is not possible to appropriately form a tree of PCI Express.

As described above, in a system that uses the PCI Express switch disclosed in PTL1 or PTL2, a PCI-PCI bridge is installed to connect switches together. Even if there is one I/O device, the problem is that an upstream PCI-PCI bridge and a downstream PCI-PCI bridge are connected uselessly. Accordingly, as the number of I/O devices to be housed in a system increases, PCI-PCI bridges are connected uselessly. Therefore, the problem is that it takes more time to configure the PCI-PCI bridges and to start the BIOS.

An exemplary object of the present invention is to provide a PCI Express switch, a PCI Express system and a network control method that make it possible to house an I/O device without passing through a PCI-PCI bridge in connecting switches in a PCI Express switch that houses a plurality of root complexes as well as to reduce the increase of the time required to start the BIOS.

Solution to Problem

An exemplary PCI Express switch of a first aspect of the present invention includes: a first PCI-PCI bridge that handles Multi Root to connect to a plurality of root complexes; a second PCI-PCI bridge that connects to an endpoint; a virtual PCI Express switch that performs a switching process between the first and second PCI-PCI bridges; and a network control device that transfers data that is to be processed in the virtual PCI Express switch to an external switch through a network without passing through a PCI-PCI bridge.

An exemplary PCI Express system of a second aspect of the present invention includes a first PCI Express switch and a second PCI Express switch, wherein the first PCI Express switch includes: a first PCI-PCI bridge that handles Multi Root to connect to a plurality of root complexes; a second PCI-PCI bridge that connects to an endpoint; a virtual PCI Express switch that performs a switching process between the first and second PCI-PCI bridges; and a network control device that transfers data that is to be processed in the virtual PCI Express switch to the second PCI Express switch through a network without passing through a PCI-PCI bridge.

An exemplary network control method of a third aspect of the present invention includes the process of, with a PCI Express switch including a first PCI-PCI bridge that handles Multi Root to connect to a plurality of root complexes, a second PCI-PCI bridge that connects to an endpoint and a virtual PCI Express switch that performs a switching process between the first and second PCI-PCI bridges, allowing the PCI Express switch to transfer data that is to be processed in the virtual PCI Express switch to an external PCI Express switch through a network without passing through a PCI-PCI bridge.

Advantageous Effects of Invention

According to the present invention, it is possible to house an I/O device without passing through a PCI-PCI bridge in connecting switches in an PCI Express switch that houses a plurality of root complexes as well as to reduce the increase of the time required to start the BIOS.

BRIEF DESCRIPTION OF DRAWINGS

FIG. 7 A block diagram illustrating an example of the configuration of a MRA-PCI Express switch disclosed in NPL1.

FIG. 8 An explanatory diagram illustrating an example of the setting of setting registers FIG. 9 An explanatory diagram illustrating an example of the setting of setting registers FIG. 10 An explanatory diagram illustrating an example of an assembled PCI tree FIG. 11 An explanatory diagram illustrating an example of an assembled PCI tree FIG. 12 A block diagram illustrating an example of the configuration of a PCI Express system according to the present invention FIG. 13 A block diagram illustrating one example of the configuration of a MRA extended PCI Express switch FIG. 14 A block diagram illustrating one example of the configuration of a MRA extended PCI Express switch FIG. 15 A block diagram illustrating one example of the configuration of a management module FIG. 16 A block diagram illustrating one example of the configuration of a network control circuit FIG. 17 An explanatory diagram illustrating an example of setting information of a setting register FIG. 18 An explanatory diagram illustrating an example of setting information of a setting register FIG. 19 An explanatory diagram illustrating an example of a VS-VLAN mapping table FIG. 20 An explanatory diagram illustrating an example of a VS-V LAN mapping table FIG. 21 An explanatory diagram illustrating an example of a network frame FIG. 22 An explanatory diagram illustrating an example of a device information frame FIG. 23 An explanatory diagram illustrating an example of an own switch device information table FIG. 24 An explanatory diagram illustrating an example of an own switch device information table FIG. 25 An explanatory diagram illustrating an example of an other switch device information table FIG. 26 An explanatory diagram illustrating an example of an other switch device information table FIG. 27 An explanatory diagram illustrating an example of an own switch device information table FIG. 28 An explanatory diagram illustrating an example of an own switch device information table FIG. 29 An explanatory diagram illustrating an example of an other switch device information table FIG. 30 An explanatory diagram illustrating an example of an other switch device information table FIG. 31 An explanatory diagram illustrating an example of an assembled PCI tree FIG. 32 An explanatory diagram illustrating an example of an assembled PCI tree FIG. 33 A block diagram illustrating an example of the minimum configuration of a PCI Express switch

DESCRIPTION OF EMBODIMENTS

Hereinafter, an embodiment of the present invention will be described with reference to the accompanying drawings. The present embodiment relates to a PCI Express system and a PCI Express switch that extend PCI Express interfaces of a computing device and a networking device used in a computer and a network device. In particular, the present embodiment relates to a method of extending a PCI Express switch that connects a plurality of computers, the configuration of a switch inside the PCI Express switch, and a routing circuit.

The following provides a brief overview of an PCI Express system and a PCI Express switch according to the present embodiment. According to the present embodiment, the PCI Express switch includes, as well as building blocks that make up a MRA-PCI Express switch, a function of transferring data, which is processed in each virtual PCI Express switch, to Ethernet (Registered Trademark) outside the switch. When data is transferred through the external Ethernet, the PCI Express switch links each virtual PCI Express switch and a virtual LAN (VLAN) on an Ethernetwork before transferring data to each VLAN.

The above process is performed by each switch. Therefore, it is possible to exchange (transmit and receive) data between virtual PCI express switches through the VLAN. It is also possible to connect switches without passing through a PCI-PCI bridge when switches are connected. a management frame of information of a PCI-PCI bridge inside each switch is exchanged (transmitted and received) on the Ethernet so that with the use of the VLAN on the Ethernet, data is transferred. Therefore, it is possible to exchange the following information and realize data communication between a plurality of switches on the Ethernet: PCI-PCI bridge information that other switches use, and MAC address information that switches and bridges each need to use to communicate.

Figure 12:
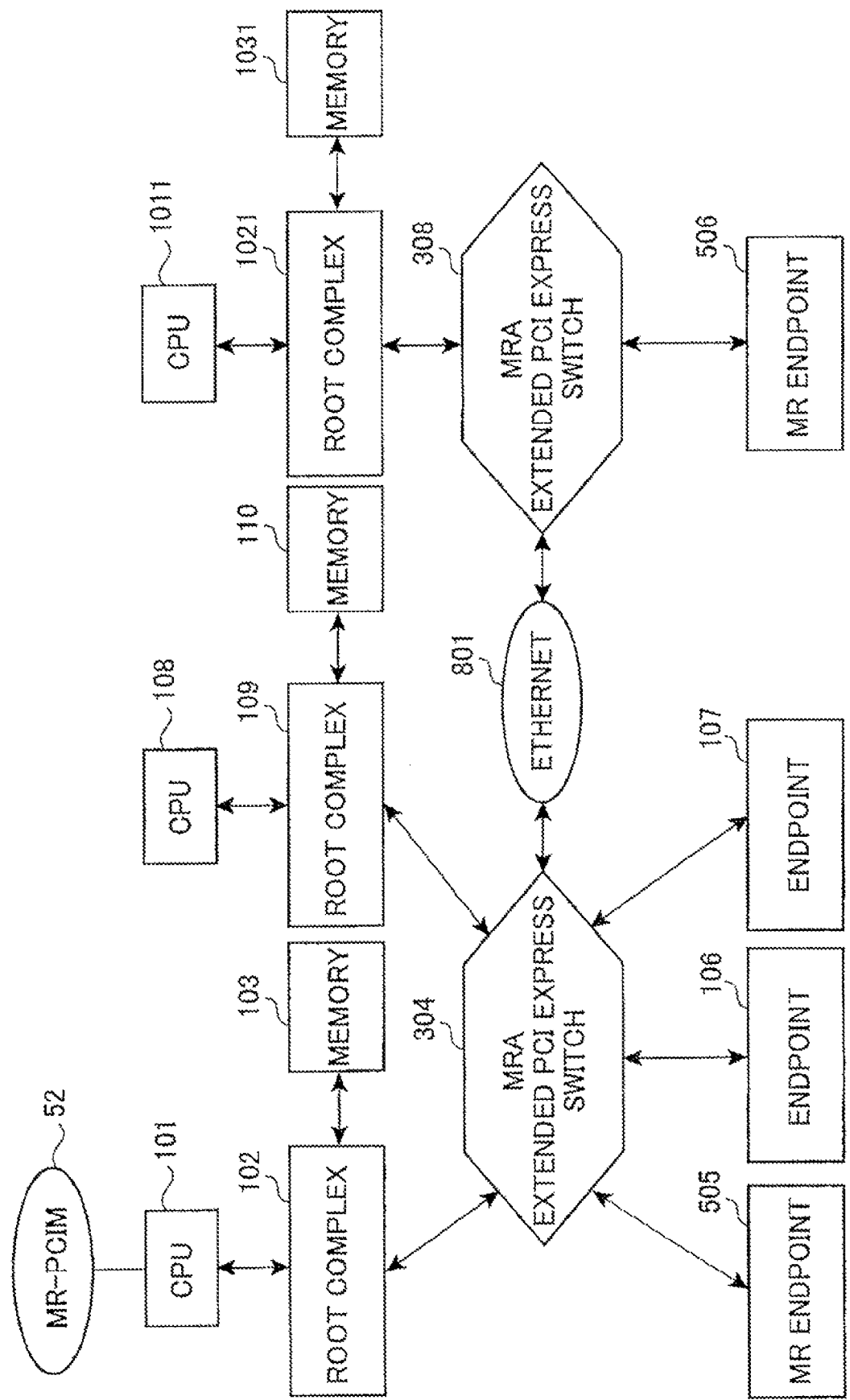

The following describes the configuration of a PCI Express system according to an embodiment of the present invention. FIG. 12 is a block diagram illustrating an example of the configuration of a PCI Express system according to an embodiment of the present invention. As shown in FIG. 12, according to the present embodiment, in the PCI Express system, a MRA extended PCI Express switch 304 is connected to a CPU 101, a CPU 108, a root complex 102, a memory 103, a root complex 109, a memory 110, a MR endpoint 505, an endpoint 106, and an endpoint 107. In the PCI Express system, the MRA extended PCI Express switch 304 is also connected to a MRA extended PCI Express switch 308 through Ethernet (Registered Trademark) 801.

The MRA extended PCI Express switch 308 is connected to a CPU 1011, a root complex 1021, a memory 1031, and a MR endpoint 506.

Incidentally; the root complexes and endpoints that can be connected to the MRA extended PCI Express switches 304 and 308 are devices that handle the PCI Express disclosed in PTL1 and NPL1 and MR endpoints disclosed in NPL1. Even if data is transferred through the Ethernet 801 shown in FIG. 12, devices can communicate with each other as in the system shown in FIGS. 5 to 7.

Figure 1:
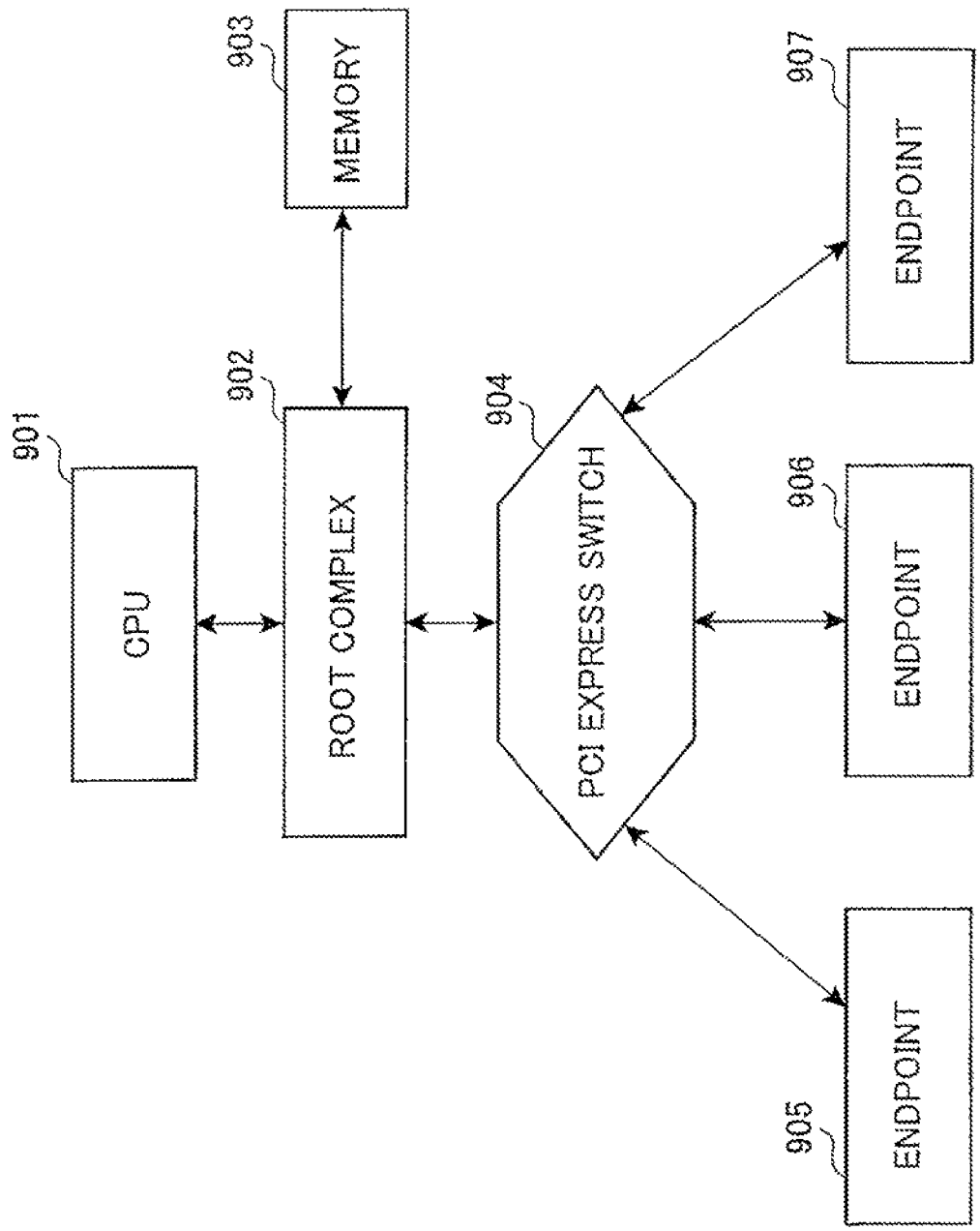
FIG. 1 A block diagram illustrating one example of the configuration of a computer system that uses PCI Express.
Figure 2:
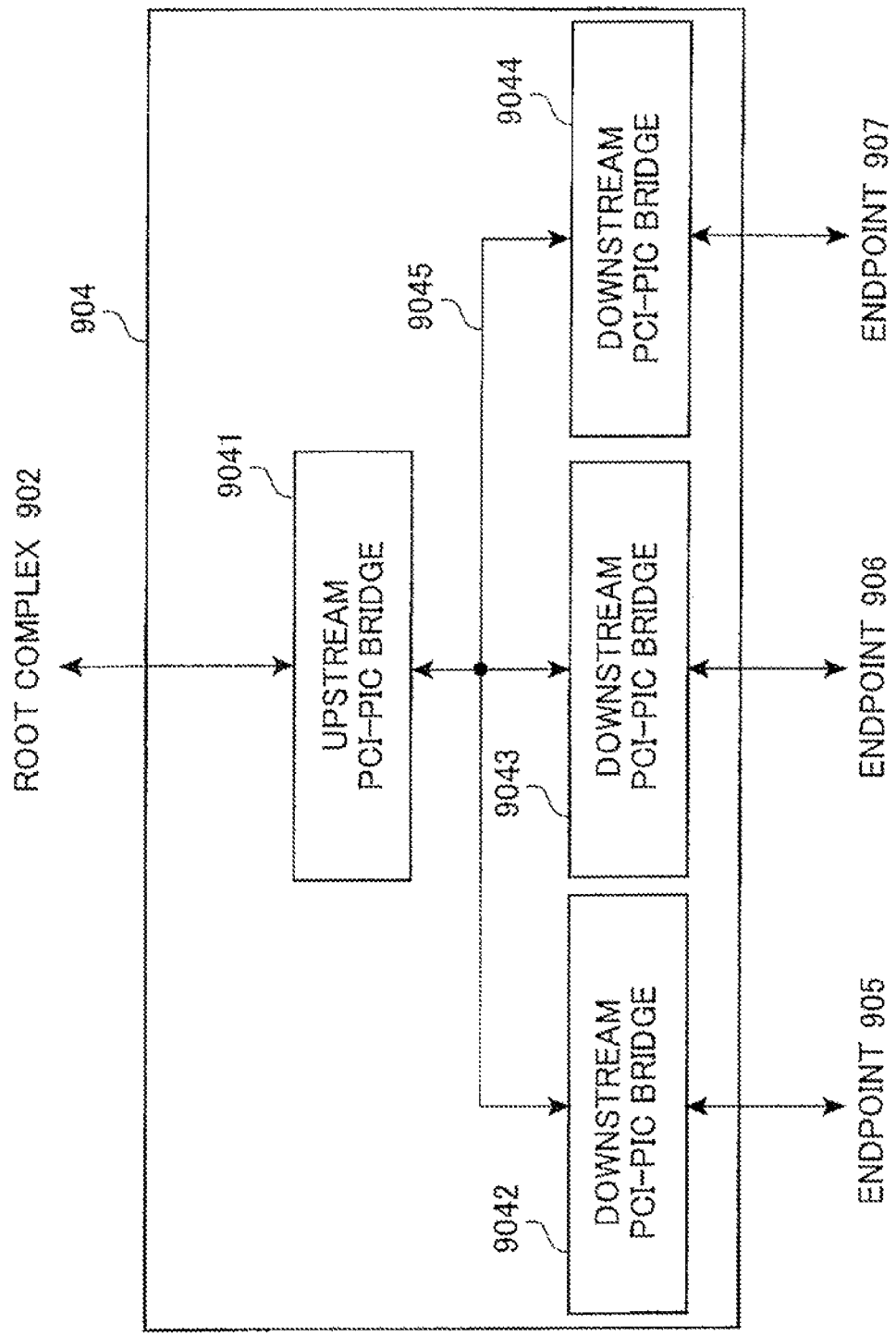
FIG. 2 A block diagram illustrating an example of the internal configuration of a PCI Express switch.
Figure 3:
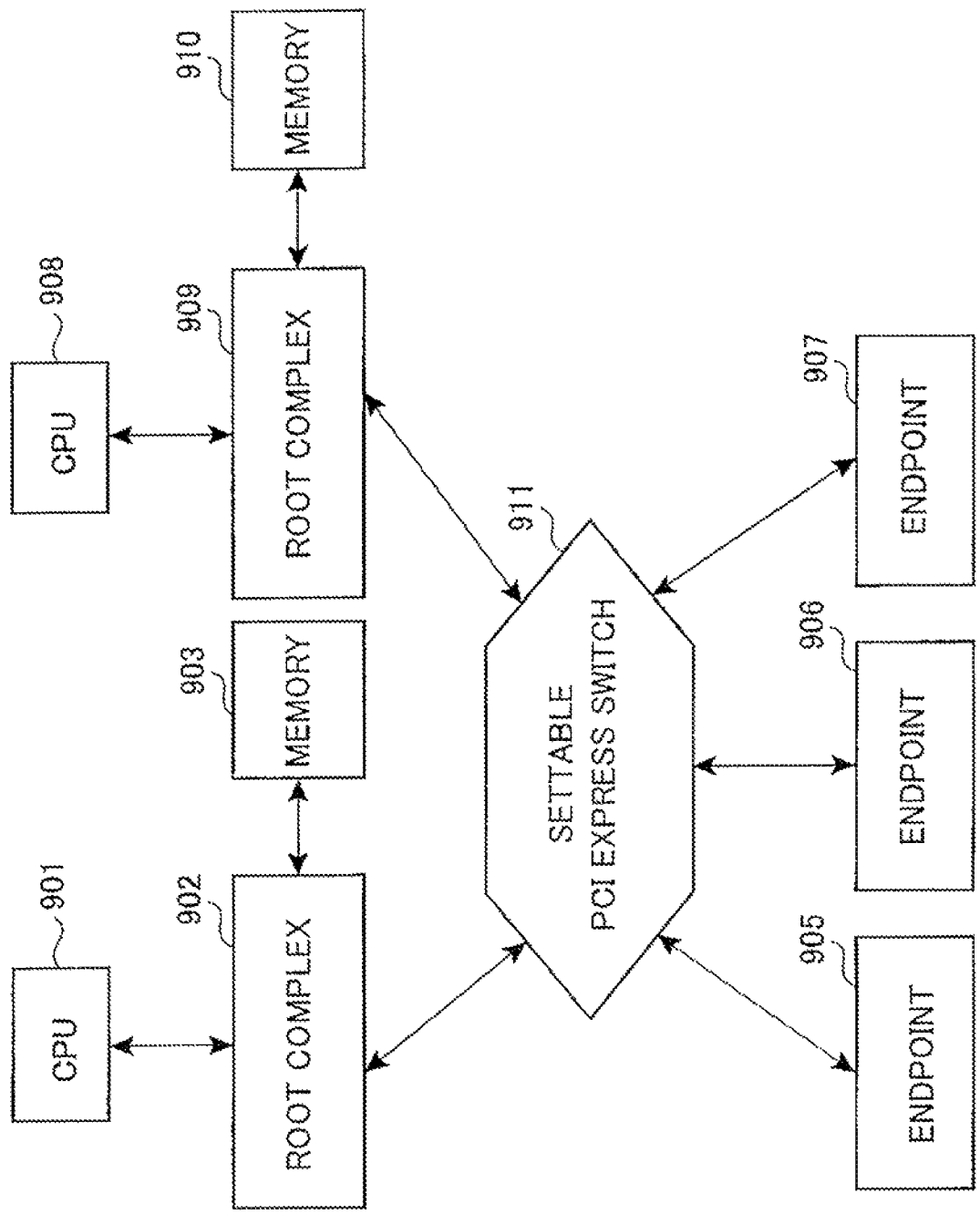
FIG. 3 A block diagram illustrating the configuration of a system that can be realized by a method disclosed in PTL1.
Figure 4:
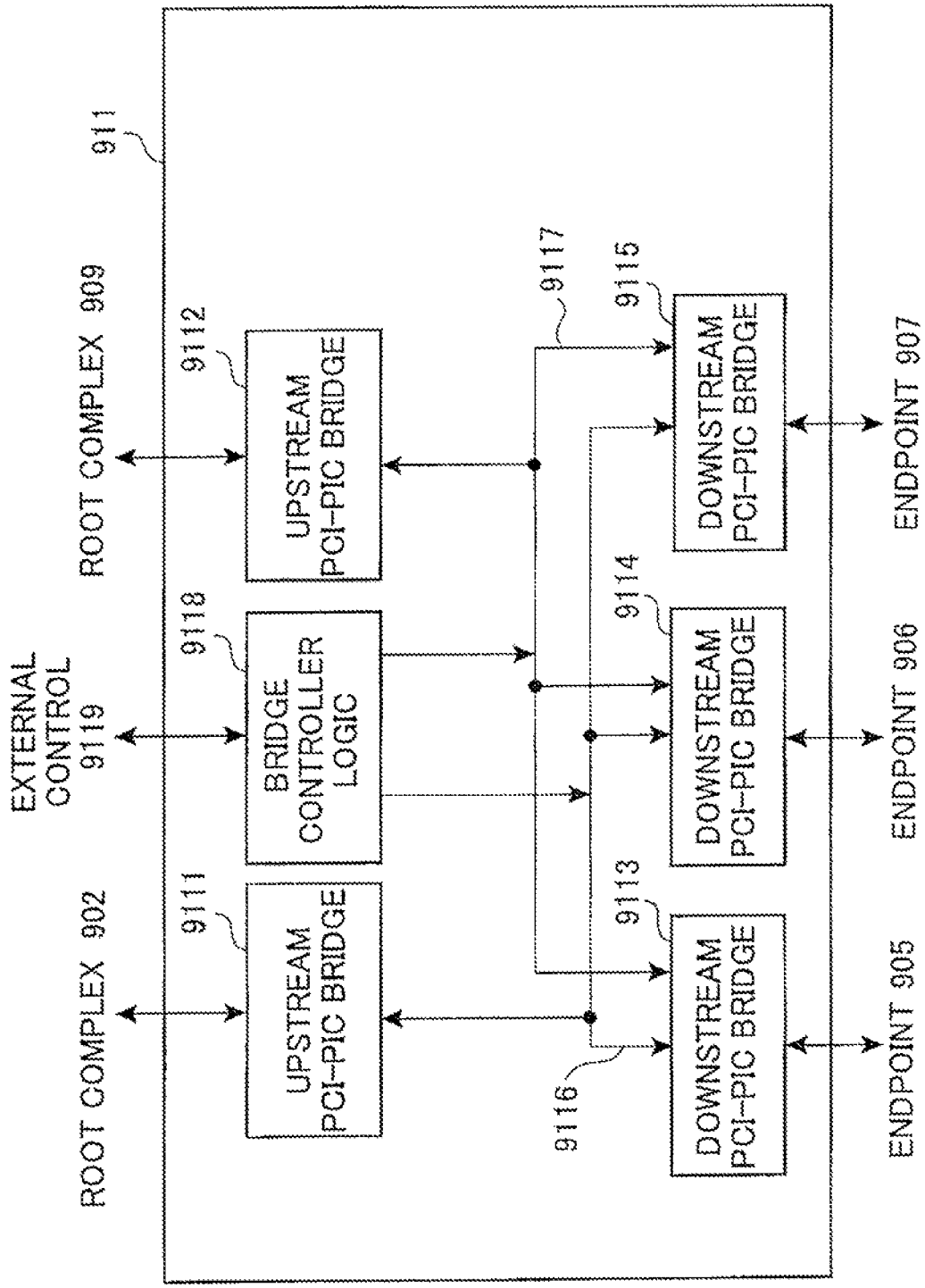
FIG. 4 A block diagram illustrating an example of the configuration of a settable PCI Express switch disclosed in PTL1.
Figure 5:
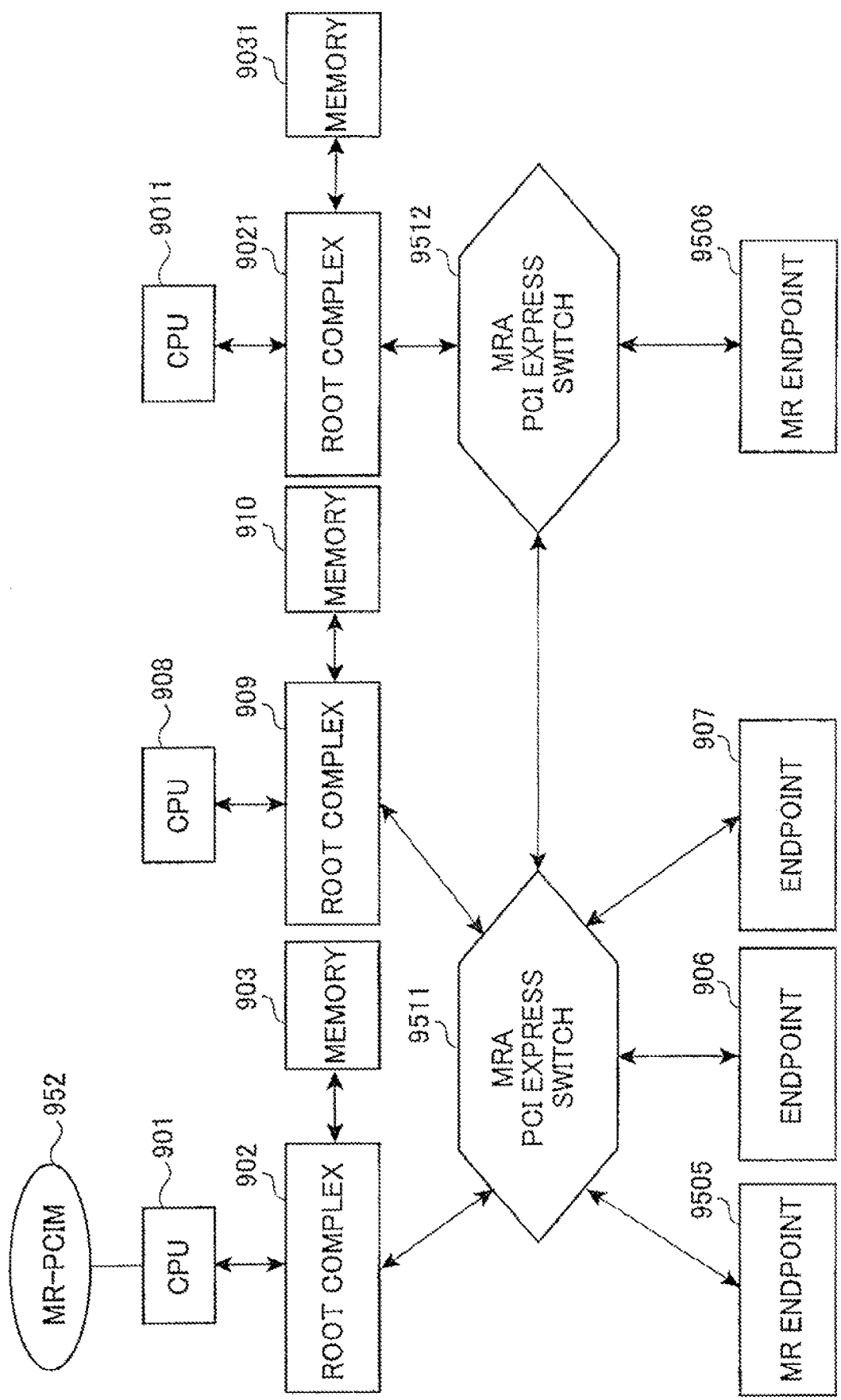
FIG. 5 A block diagram illustrating the configuration of a system that can be realized by a method disclosed in NPL1.
Figure 6:
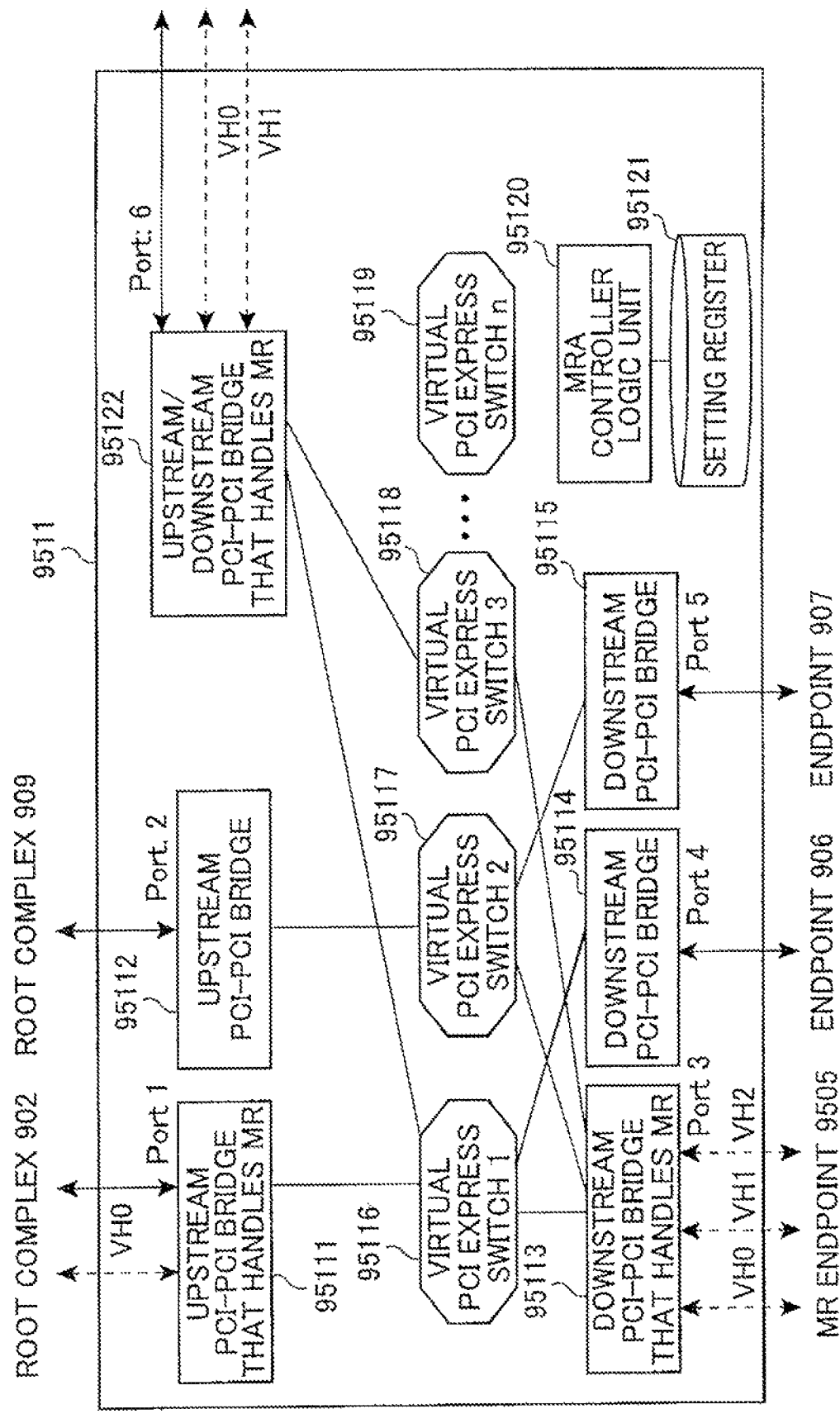
FIG. 6 A block diagram illustrating an example of the configuration of a MRA-PCI Express switch disclosed in NPL1.
Figure 10:
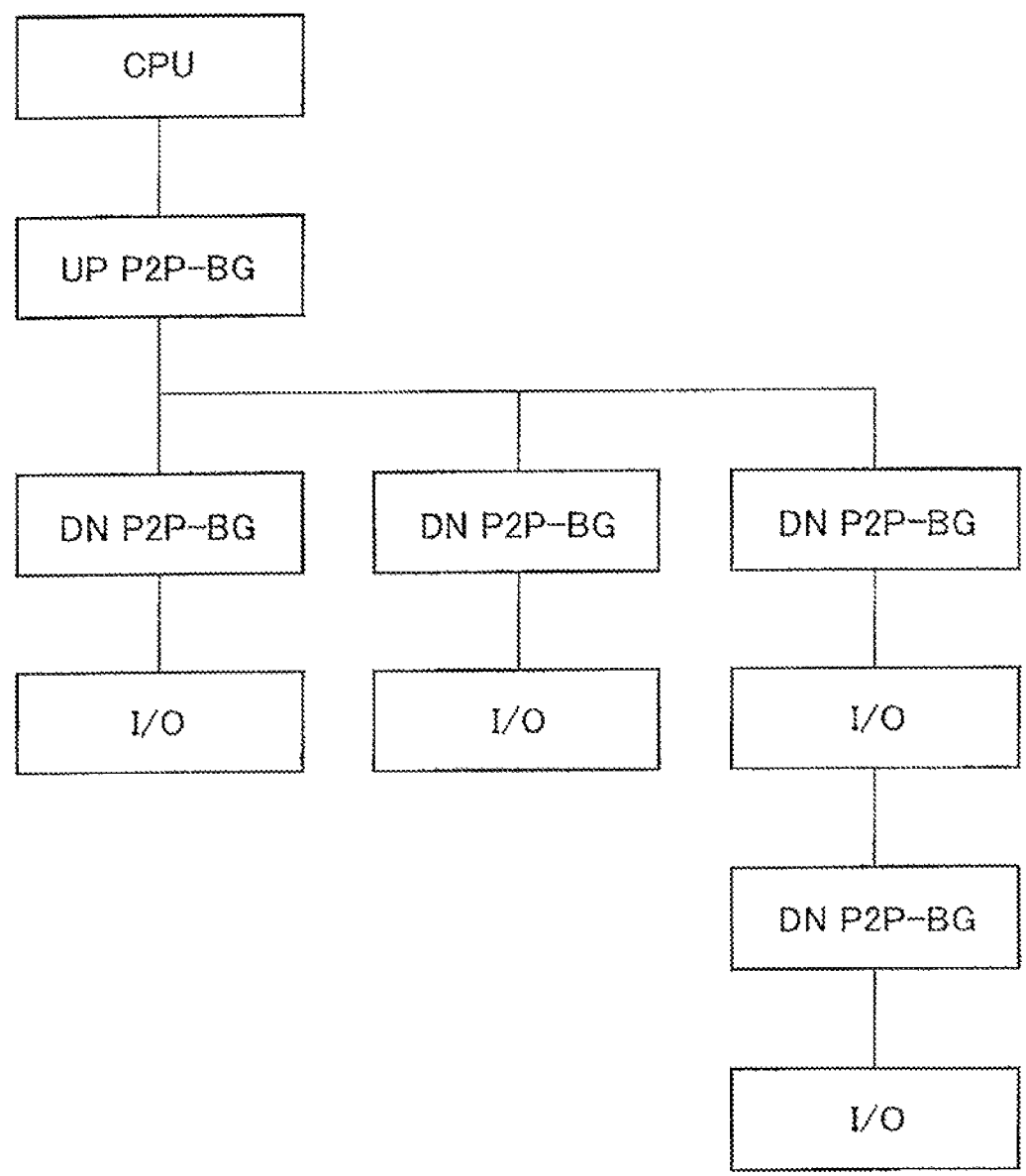
Figure 11:
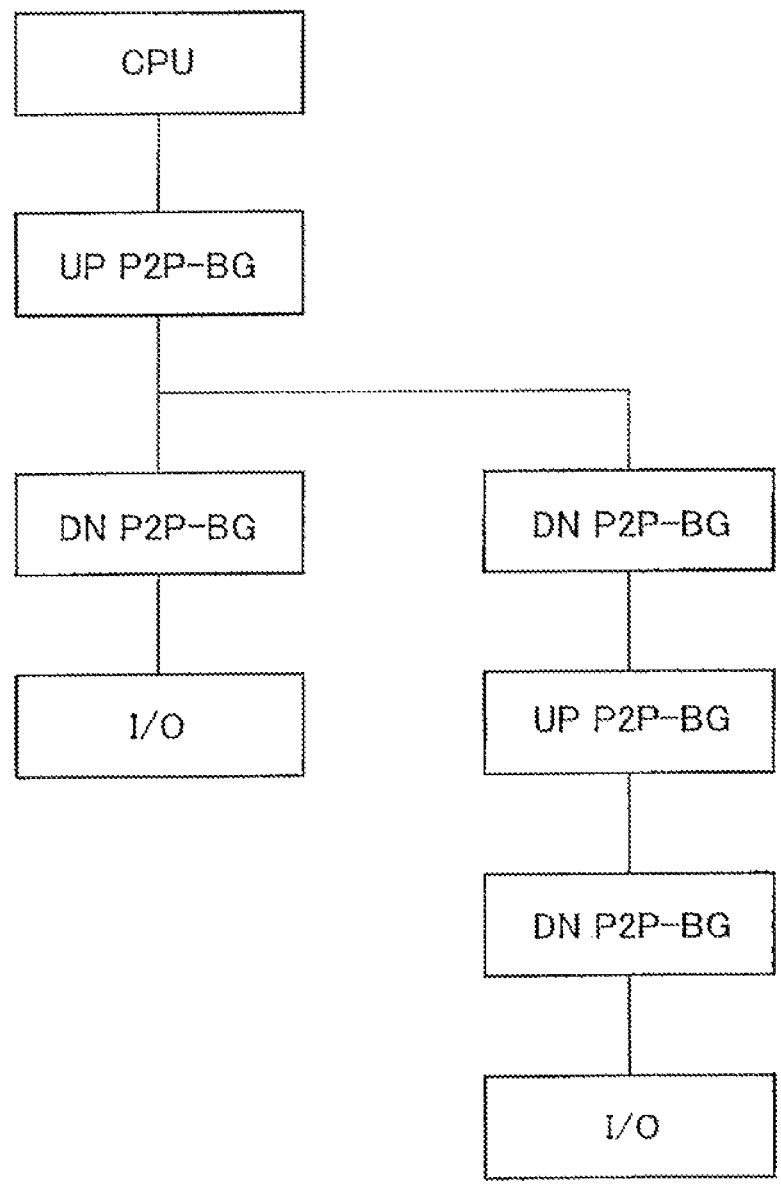

What is described in the present, embodiment is how the MRA extended PCI Express switches 304 and 308 are made in order to realize similar communication to the example of the configuration of the MRA-PCI Express switches shown in FIGS. 5 to 7. The following also describes what kind of setting makes possible such communication. Hereinafter, the internal configuration, operation and setting state of the MRA extended PCI Express switches 304 and 308 will be described.

The following describes the internal configuration of the MRA extended PCI Express switches 304 and 308. According to the present embodiment, the MRA extended PCI Express switches 304 and 308 use the following components, which are also used in the MRA-PCI Express: upstream PCI-PCI bridges, downstream PCI-PCI bridges, downstream PCI-PCI bridges that handle MR, MRA controller logic units, and setting registers. In addition to the above building blocks, the MRA extended PCI Express switches 304 and 308 include virtual PCI Express switches, which handle the transmitting or receiving of data to or from an external network, and network control circuits, which are equipped with a function of transmitting or receiving data to or from the Ethernet 801. The MRA extended PCI Express switches 304 and 308 also include management modules that acquire and manage network addresses needed to transmit or receive data between the MRA extended PCI Express switches 304 and 308 through the Ethernet 801.

Figure 13:
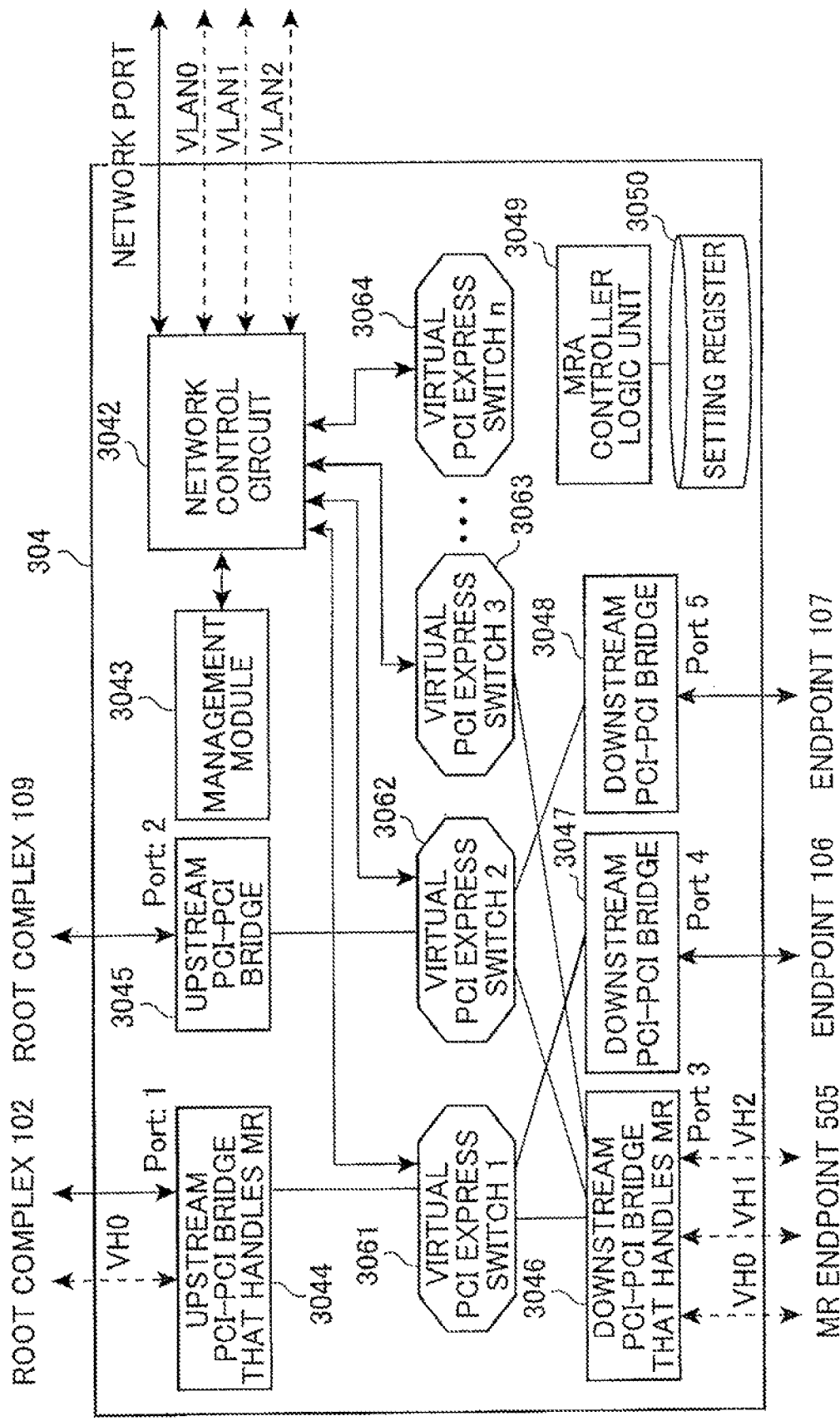
Figure 14:
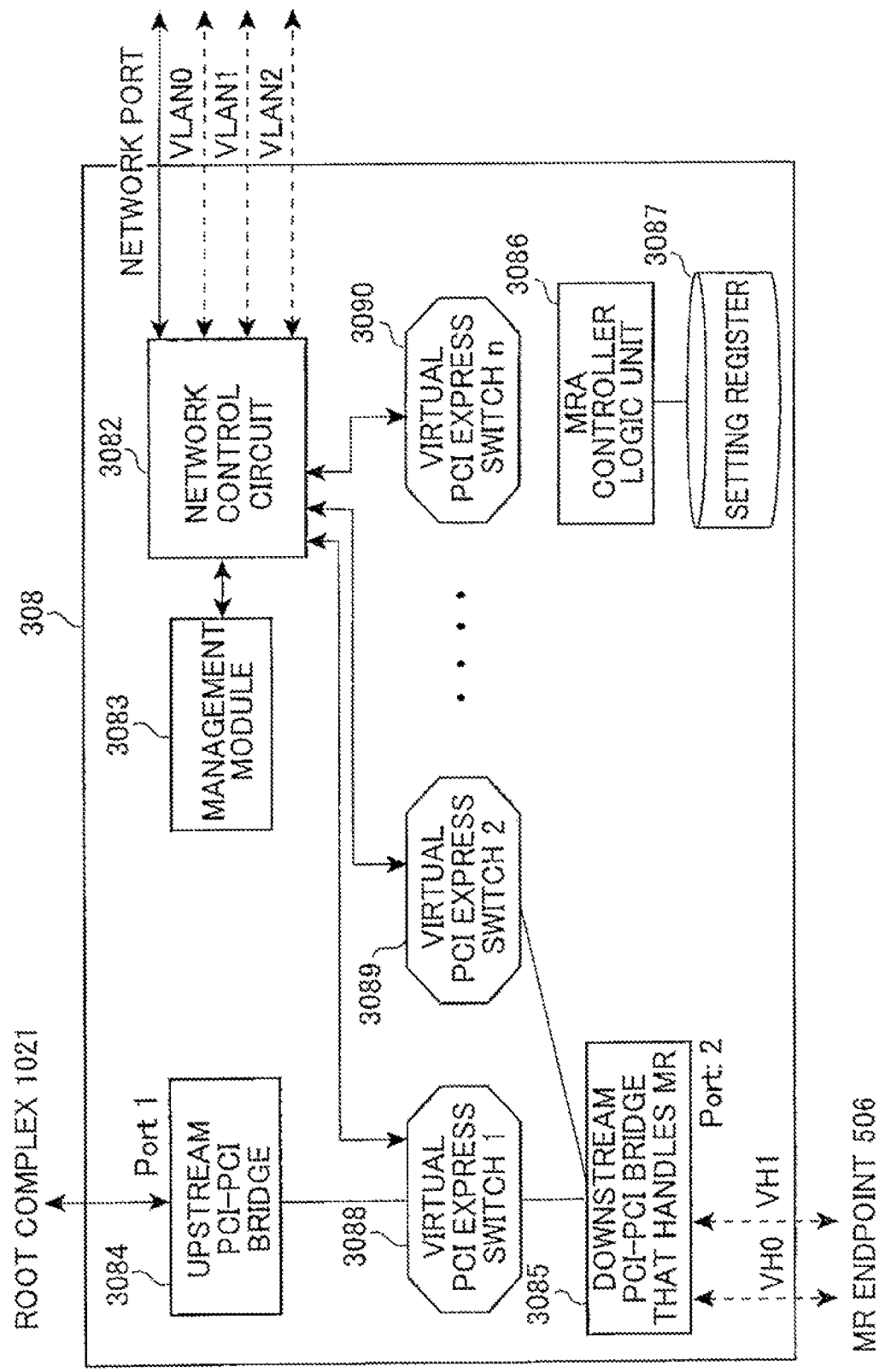

FIG. 13 is a block diagram illustrating one example of the configuration of the MRA extended PCI Express switch 304. FIG. 14 is a block diagram illustrating one example of the configuration of the MRA extended PCI Express switch 308.

As shown in FIG. 13, the MRA extended PCI Express switch 304 includes upstream PCI-PCI bridges 3044 and 3045 that handle MR, downstream PCI-PCI bridges 3047 and 3048, a downstream PCI-PCI bridge 3046 that handles MR, virtual PCI Express switches 3061, 3062, 3063 and 3064 (Switches 1 to n), a MRA controller logic unit 3049, a setting register 3050, a network control circuit 3042 acting as a network control device, and a management module 3043.

As shown in FIG. 14, the MRA extended PCI Express switch 308 includes an upstream PCI-PCI bridge 3084, a downstream PCI-PCI bridge 3085 that handles MR, virtual PCI Express switches 3088, 3089 and 3090 (Switches 1 to n), a MRA controller logic unit 3086, a setting register 3087, a network control circuit 3082, and a management module 3083.

In the PCI-PCI bridges that handle MR, VH numbers are assigned in a similar way to the MRA-PCI Express switches shown in FIGS. 5 to 7. As for the settings based on instructions from the MR-PCIM 52, the MRA extended PCI Express switches 304 and 308 set the setting registers 3050 and 3087 through a port of VH0 and the MRA controller logic units 3049 and 3086. Therefore, the MRA extended PCI Express switches 304 and 308 determine a virtual PCI Express switch to be used, a port thereof, and a VH number as well as makes a determination as to whether the bridge is an upstream or downstream one. Accordingly, a tree of PCI Express is assembled for a root complex, making it possible to access an endpoint.

Accordingly, the process of transferring data between the root complexes and the endpoints in the MRA extended PCI Express switches 304 and 308 is performed in the same way as in the MRA-PCI Express switch shown in FIGS. 5 to 7.

According to the present embodiment, the MRA extended PCI Express switches 304 and 308 are characterized in that the data to be processed in the virtual PCI Express switches is exchanged (received and transmitted) between the MRA extended PCI Express switches through a network such as Ethernet 801, not through PCI-PCI bridges. For example, when the data to which a switching process is applied by virtual PCI Express switches (1 to n) 3061, 3062, 3063 and 3064 is transferred to any components other than the PCI-PCI bridges inside the switch, the MRA extended PCI Express switch 304 shown in FIG. 13 uses the network control circuit 3042 to carry out data communication with other MRA extended PCI Express switches.

When data communication is carried out through a network, it is necessary to acquire and figure out a network address. Therefore, the MRA extended PCI Express switches 304 and 308 manage address information using the management modules 3043 and 3083. When data is transferred from each virtual PCI Express switch to another MRA extended PCI Express switch, the MRA extended PCI Express switches 304 and 308 manage the relationships between the configuration information of the virtual PCI Express switches and network addresses (For example, the configuration information and the network addresses are stored in a storage unit, such as a memory, in such a way that the configuration information and the network addresses are linked to each other). The MRA extended PCI Express switches 304 and 308 give appropriate network addresses when data is transferred. With the above configuration, it is possible to carry out data communication between the MRA extended PCI Express switches.

The MRA extended PCI Express switches 304 and 308 are characterized in that, when data is transferred through a network, in the MRA extended PCI Express switches 304 and 308, data is logically divided by a plurality of virtual PCI Express switches before a switching process is performed. Accordingly, even when data is transferred through a network, the MRA extended PCI Express switches 304 and 308 carry out the logical separation of the network even on the Ethernet 801 using the VLAN of the Ethernet 801. The MRA extended PCI Express switches 304 and 308 then link the logical separation of the virtual PCI Express switches and the logical separation on the Ethernet (Registered Trademark) 801. Therefore, between a plurality of MRA extended PCI Express switches, the situation where virtual PCI Express switches are connected is made; it is also possible to share and extend the virtual PCI Express switches. More specifically, the MRA extended PCI Express switches 304 and 308 transfer data after the mapping of the VLANs (1 to n) for each of the virtual PCI Express switches (1 to n) when data is transferred through a network.

Figure 15:
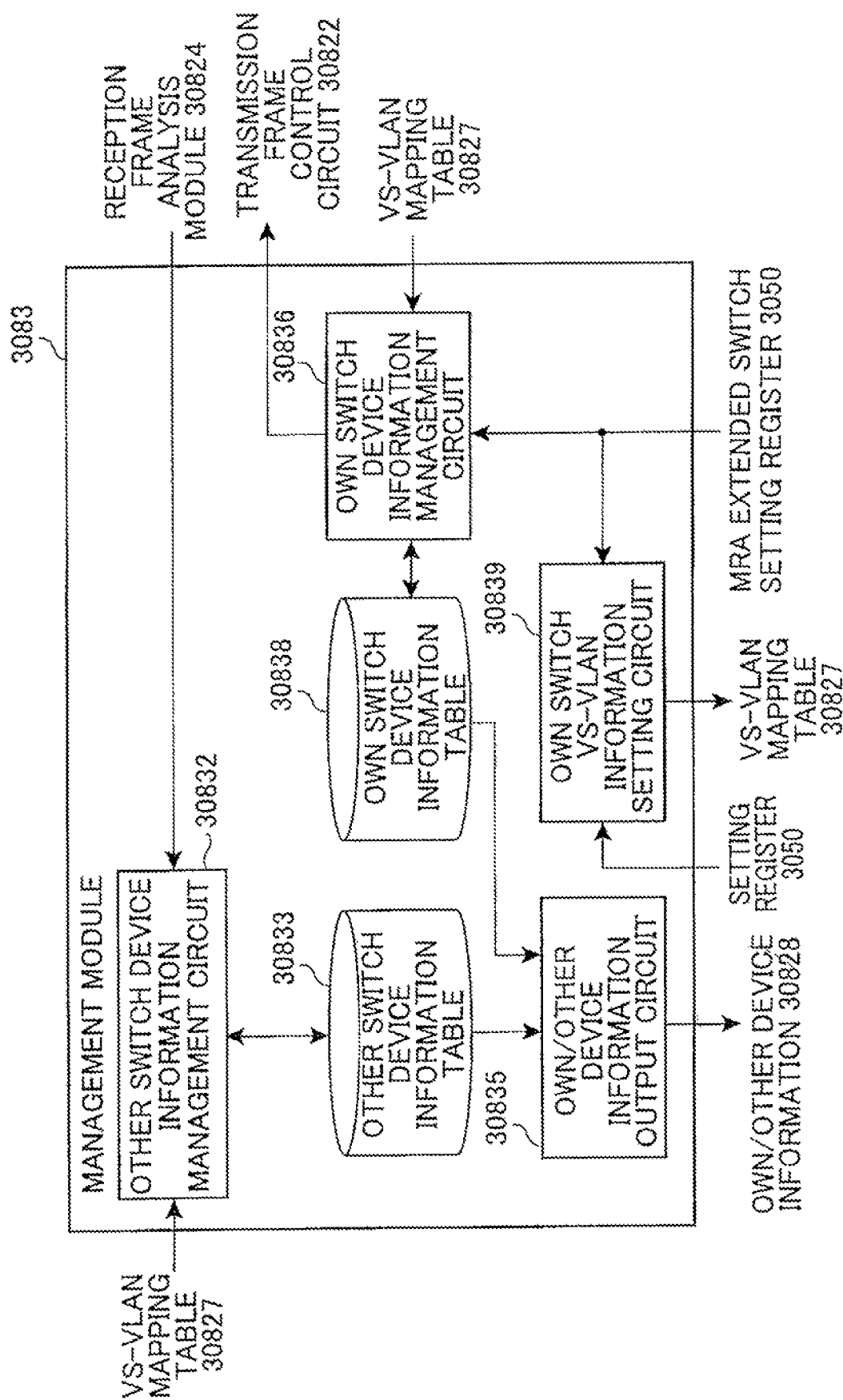

FIG. 15 is a block diagram illustrating an example of the configuration of the management module 3083 that is used when data is transferred between the MRA extended PCI Express switches through a network. FIG. 16 is a block diagram illustrating an example of the configuration of the network control circuit 3082 that is used when data is transferred between the MRA extended PCI Express switches through a network.

Incidentally, the configuration of the network control circuit 3042 that the MRA extended PCI Express switch 304 has is the same as the configuration of the network control circuit 3082 shown in FIG. 16. The configuration of the management module 3043 that the MRA extended PCI Express switch 304 has is the same as the configuration of the management module 3083 shown in FIG. 15. However, between the MRA extended PCI Express switches 304 and 308, data to be stored in an other switch device information table 30833, an own switch device information table 30838 and a VS-VLAN mapping table 30827 is different.

The following describes the configuration and operation of the network control circuit 3082 with reference to FIG. 16. As shown in FIG. 16, the network control circuit 3082 includes a network frame generation circuit 30829, a transmission frame control circuit 30822, a reception frame analysis module 30824, a reception frame control circuit 30823, the VS-VLAN mapping table 30827, and a PCIe frame generation circuit 30826.

When data is transferred from the virtual PCI Express switches and between switches, the data of PCI Express is transmitted from each virtual PCI Express switch to the network frame generation circuit 30829 that generates a data transfer frame for a network. After receiving the data of PCI Express, the network frame generation circuit 30829 uses the following to convert data to a network frame 2009 shown in FIG. 21: the VS-VLAN mapping table 30827, and the own/other device information 30828 output from the management module 3083. Incidentally, the VS-VLAN mapping table 30827 is for example stored in a storage unit, such as a memory, that the network control circuit 3082 has.

The VS-VLAN mapping table 30827 stores mapping information showing one of the VLANs (1 to n) of the Ethernet 801 that is used in transferring the data from each of the virtual PCI Express switches (1 to n).

The own/other device information 30828 is information that is output based on the own switch device information table 30838 and an other switch device information table 30833 of the management module 3083. The own/other device information 30828 is used to obtain MAC address information of the source and destination that are used to transmit PCI Express data from the virtual PCI Express switches to a network.

Figure 21:
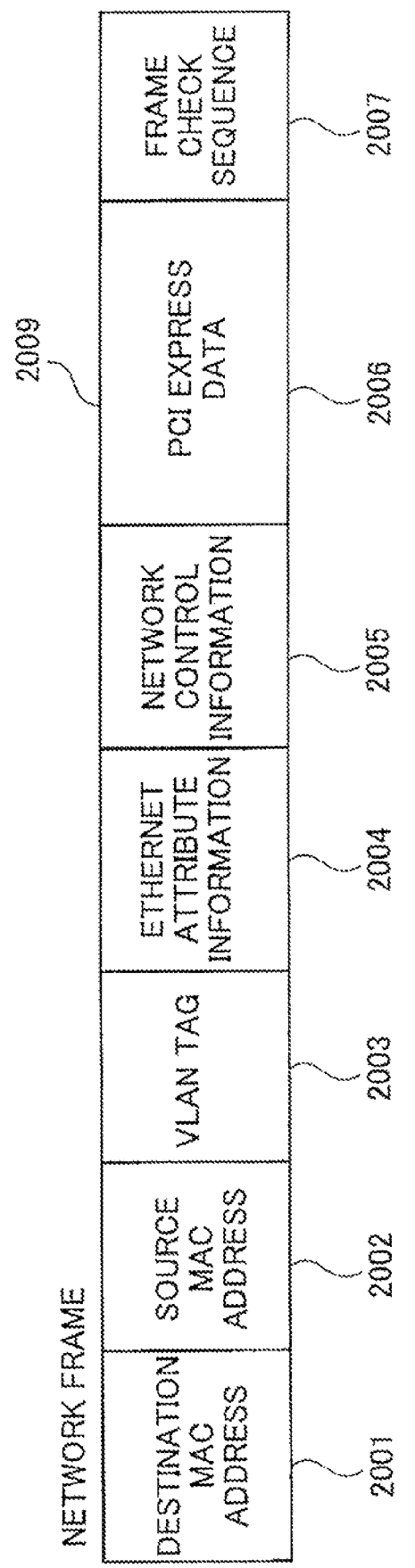

As shown in FIG. 21, the network frame 2009 includes a destination MAC address 2001, a source MAC address 2002, a VLAN tag 2003, Ethernet attribute information 2004, network control information 2005, PCI Express data 2006, and a frame check sequence 2007. The network frame 2009 is an Ethernet frame defined by IEEE802.3 and can be transferred by an Ethernet network device.

FIG. 19 is an explanatory diagram illustrating an example of a VS-VLAN mapping table 30827-1 that the MRA extended PCI Express switch 304 has. As shown in FIG. 19, according to the present embodiment, the VS-VLAN mapping table 30827-1 that the MRA extended PCI Express switch 304 has sets the VLAN 1 for the virtual PCI Express switch 1, the VLAN 2 for the virtual PCI Express switch 2, and the use of the VLAN 2003 for the virtual PCI Express switch 3 to transfer data.

FIG. 20 is an explanatory diagram illustrating an example of a VS-VLAN mapping table 30827-5 that the MRA extended PCI Express switch 308 has. As shown in FIG. 20, the VS-VLAN mapping table 30827-5 is set. Therefore, the virtual PCI Express switch 1 inside the MRA extended PCI Express switch 308 uses the VLAN 2003 to transfer data. The virtual PCI Express switch 2 uses the VLAN 1 to transfer data.

Thanks to the setting of the VS-VLAN mapping table 30827-1 and VS-VLAN mapping table 30827-5 shown in FIGS. 19 and 20, in the VLAN 1, data communication is carried out between the virtual PCI Express switch 1 of the MRA extended PCI Express switch 304 and the virtual PCI Express switch 2 of the MRA extended PCI Express switch 308. Similarly, in the VLAN 2003, data communication is carried out between the virtual PCI Express switch 3 of the MRA extended PCI Express switch 304 and the virtual PCI Express switch 1 of the MRA extended PCI Express switch 308.

The VLAN 2 is defined only on the VS-VLAN mapping table 30827-1. Therefore, under the state of the settings shown in FIGS. 19 and 20, data is not transferred from the MRA extended PCI Express switch 304 to the virtual PCI Express switches inside the MRA extended PCI Express switch 308. However, as described below, device information is issued (transmitted) on the VLAN 2 by the management module 3083. In this case, the management module 3083 of the MRA extended PCI Express switch 308 figures out (identifies) the configuration state of the virtual PCI Express switch 2 of the MRA extended PCI Express switch 304 on the basis of the issued device information. The management module 3083 then is used to carry out the mapping for the VLAN 2 of a new virtual PCI Express switch when an endpoint device of the MRA extended PCI Express switch 308 is to be connected to the virtual PCI Express switch 2 of the MRA extended PCI Express switch 304'.

FIGS. 23 and 24 are explanatory diagrams illustrating an example of the own switch device information table 30838 inside the MRA extended PCI Express switch 304. FIGS. 25 and 26 are explanatory diagrams illustrating an example of the other switch device information table 30833 inside the MRA extended PCI Express switch 304.

To transfer data from the virtual PCI Express switch to an external MRA extended PCI Express switch, the network frame generation circuit 30829 determines the destination MAC address 2001 of the network frame 2009 shown in FIG. 21 with the use of information of the other switch device information table 30833 as well as the source MAC address 2002 with the use of information of the own switch device information table 30838. In this case, the network frame generation circuit 30829 stores the VLAN information obtained from the above VS-VLAN mapping table 30827 in the VLAN tag 2003 of the network frame 2009.

The network frame generation circuit 30829 also stores a TLP packet of PCI Express transferred from a PCI Express virtual switch in PCI Express data 2006 without changes. The network frame generation circuit 30829 also uses the network control information 2005 as control information used to transfer network data, such as congestion control or how far data has reached on the Ethernet 801 in the transmission frame control circuit 30822 and the reception frame control circuit 30823.

Moreover, the Ethernet attribute information 2004 represents the frame type of an Ethernet frame. The network frame generation circuit 30829 stores a fixed value, which is determined by a standard or uniquely by a user, as the Ethernet attribute information 2004. The network frame generation circuit 30829 uses the Ethernet attribute information 2004 to make a determination as to whether the present Ethernet frame is a network frame 2 on the Ethernet 801 and in the reception frame analysis module 30824.

The following describes the own switch device information table 30838. The own switch device information table 30838 includes two tables: a table where the MAC address of the switch is stored and a table where the MAC address of each virtual PCI Express switch inside the MRA extended PCI Express switch is stored on a per-port basis. The information of the own switch device information table 30838 is set by exchanging (transmitting and receiving) a device information frame 701 shown in FIG. 22 by the management module 3043 between the MRA extended PCI Express switches.

The following describes the other switch device information table 30833. The other switch device information table 30833 includes two tables: a table where the MAC address of the other switch is stored and a table where the MAC address of each virtual PCI Express switch inside the other MRA extended PCI Express switch is stored on a per-port basis. For a virtual Express switch number on the other switch device information table 30833, a value that has passed through the VS-VLAN mapping table 30827 is stored. Accordingly, after the MRA extended PCI Express switch 304 is connected to a virtual PCI Express switch of the other switch through a VLAN, the MRA extended PCI Express switch 304 can figure out (identify) the information of the other device that is in the same space as a virtual PCI Express switch of the MRA extended PCI Express switch 304 with the use of the other switch device information table 30833.

For example, in the example shown in FIGS. 23, 24, 25 and 26, when the data that comes from the port 1/VH0/upstream port of the virtual PCI Express switch 1 of the MRA extended PCI Express switch 304 is transferred to the port 2/VH0/downstream port of the MRA extended PCI Express switch 308, the utilization MAC address "00-00-4c-01-01-01" entered from an own switch device information table 30838-2 into the port 1/VH0/upstream of the virtual PCI Express switch 1 is used as the source MAC address 2001. Moreover, "00-00-4c-02-02-01" entered into the port 2/VH0/downstream of the virtual PCI express switch number 1 of an other switch device information table 30833-2 is used as the destination MAC address 2002.

When a unicast transfer process is performed, the above method can be used to determine a destination MAC address. However, when a broadcast transfer process is performed in the process of transferring data of PCI Express, it is not possible to determine a destination MAC address. In this case, for example, the MRA extended PCI Express switch 304 adds (outputs) the data entered from the port 1/VH0/upstream port of the virtual PCI Express switch 1 of the MRA extended PCI Express switch 304 to the port 2/VH0/downstream port of the MRA extended PCI Express switch 308. When data is transferred to another port, the MRA extended PCI Express switch 304 uses the MAC address "00-00-4c-01-00-00", which is used by a switch of the own switch device information table 30838-1 shown in FIG. 23, as the source MAC address 2001. The MRA extended PCI Express switch 304 then uses, as a destination MAC address, a MAC address (the MAC address "00-00-4c-02-00-00" of a connected switch) stored in the other switch device information table 30833-1 shown in FIG. 25 to transfer.

When there is a plurality of targets to be connected, the MRA extended PCI Express switch 304 may transfer a frame in which the MAC address of each switch is stored to each target. Alternatively, a broadcast transfer process may be performed on the Ethernet 801 with the destination MAC address set at (ALL F). Since the VLAN is used in accordance with the VS-VLAN mapping table 30827, the MRA extended PCI Express switch 304 transfers data within a VS-VLAN when a broadcast transfer process is performed.

FIGS. 27 and 28 are explanatory diagrams illustrating an example of the own switch device information table 30838 in the MRA extended PCI Express switch 308. FIGS. 29 and 30 are explanatory diagrams illustrating an example of the other switch device information table 30833 inside the MRA extended PCI Express switch 304.

In a similar way to the above MRA extended PCI Express switch 304, the MRA extended PCI Express switch 308 transfers data in accordance with the settings of the own switch device information table 30838. For example, when the data entered from the port 1/(N/A)/upstream port of the virtual PCI Express switch 1 is transferred to the port 3/VH2/downstream port of the MRA extended PCI Express switch 304, the MRA extended PCI Express switch 308 uses, as the source MAC address 2001, the utilization MAC address "00-00-4c-02-01-01" entered from an own switch device information table 30838-52 into the port UNA/upstream of the virtual PCI Express switch 1. The MRA extended PCI Express switch 308 also uses, as the destination MAC address 2002, "00-00-4c-01-03-02" entered into the port 3/VH2/downstream of the virtual PCI Express switch number 1 of an other switch device information table 30833-52.

As described above, after generating the network frame 2009 used to transfer data to another MRA extended PCI Express switch, the MRA extended PCI Express switch 308 transmits the network frame as a transmission network frame 20091 with the use of the transmission frame control circuit 30822 through a network.

When data is received from a virtual PCI Express switch of another MRA extended PCI Express switch and between switches, the MRA extended PCI Express switch 308 receives a frame through the reception frame control circuit, 30823 with the use of the reception frame analysis module 30824. Then, the MRA extended PCI Express switch 308 transfers the received network frame by the reception frame analysis module 30824 with the use of the information of the VS-VLAN mapping table 30827 and own/other device information 30828.

In the above case, when the data should be transferred into the own switch, the MRA extended PCI Express switch 308 uses the VS-VLAN mapping table 30827 to make a determination as to which one of the virtual PCI Express switches (1 to n) should be selected for data from each Ethernet VLAN (1 to n). Then, the MRA extended PCI Express switch 308 transfers the data to the corresponding virtual PCI Express switch inside the own switch through the PCIe frame generation circuit 30826 that generates the PCI Express data 2006 from the network frame 2009. Moreover, the MRA extended PCI Express switch 308 uses the reception frame analysis module 30824 to transfer data to an other switch device information manager 30832 if the frame is the device information management frame shown in FIG. 22.

When the data that comes from the port 1/VH0/upstream port of the virtual PCI Express switch 1 of the above MRA extended PCI Express switch 304 is transferred to the port 2/VH0/downstream port of the MRA extended PCI Express switch 308, the MRA extended PCI Express switch 308 uses the VS-VLAN mapping table 30827-5 shown in FIG. 20 to transfer data of the VLAN 1 to the virtual PCI Express switch 2.

When the data entered from the port 1/(N/A)/upstream port of the virtual PCI Express switch 1 of the MRA extended PCI Express switch 308 is transferred to the port 3/VH2/downstream port of the MRA extended PCI Express switch 304, data that flows on a network is transferred with the use of the VLAN 2003. In this case, the MRA extended PCI Express switch 304 uses the VS-VLAN mapping table 30827-1 shown in FIG. 19 to transfer data of the VLAN 2003 to the virtual PCI Express switch 3.

In order to make a determination as to whether there is data inside the own switch that should be transferred, the MRA extended PCI Express switch 308 uses the information of the VS-VLAN mapping table 30827 and the own/other device information 30828 to perform a filtering process of data. In this case, the MRA extended PCI Express switch 308 determines a virtual PCI Express switch number on the basis of the VLAN tag 2003 of the received network frame 2009 using the VS-VLAN mapping table 30827. Moreover, the MRA extended PCI Express switch 308 checks (determines) whether there is the source MAC address 2002 of the received network frame 2009 among the virtual PCI Express switch numbers of the other switch device information table 30833. The MRA extended PCI Express switch 308 also checks (determines) whether there is the source MAC address 2001 of the received network frame 2009 among the virtual PCI Express switch numbers of the own switch device information table 30838.

The following looks at the case where the data entered from the port 1/VH0/upstream port of the virtual PCI Express switch 1 of the above MRA extended PCI Express switch 304 is transferred to the port 2/VH0/downstream port of the MRA extended PCI Express switch 308. The MRA extended PCI Express 308 performs a filtering process using the reception frame analysis module 30824. In this case, since data is entered from the VLAN 1, the MRA extended PCI Express switch 308 uses the VS-VLAN mapping table 30827-5 shown in FIG. 20 to set the virtual PCI Express switch number to "2" and the source MAC address of the input frame to "00-00-4c-01-01-01." The above settings exist in the first item among those with a virtual PCI Express switch number of 2 on the other switch device information table 30833-52 of FIG. 30.

Moreover, the destination MAC address of the frame is "00-00-4c-02-02-01" and is located in the third item of the own switch device information table 30838-52 of FIG. 28. Therefore, the MRA extended PCI Express switch 308 does not perform a filtering process and transfers data to the corresponding virtual PCI Express switch 2 inside the own switch through the PCIe frame generation circuit 30826 that generates the PCI Express data 2006.

When the MAC address is checked, a broadcast transfer process may be performed. Therefore, the MRA extended PCI Express switch 308 makes a comparison between the other switch device information table 30833-51 of FIG. 29 and the source MAC address as well as a comparison between the own switch device information table 30838-51 of FIG. 27 and the destination MAC address.

The following describes how the management module 3083 manages the transferring of data with the use of the above VS-VLAN mapping table 30827, own switch device information table 30838, and other switch device information table 30833, as well as the function and operation of the management module 3083.

The management module 3083 manages the information required for network communication (the storing/updating of information, for example) on the basis of the setting register controlled by the MRA controller logic unit 3086 and generates a device information frame on the basis of the information that the management module 3083 manages. The management module 3083 exchanges (transmits and receives) the device information frame 701 between the MRA extended PCI Express switches. Therefore, it is possible to realize an address management function needed for the virtual PCI Express switches inside a plurality of the MRA extended PCI Express switches to carry out data communication using the VLAN of the Ethernet (Registered Trademark) 801.

The management module 3083 also manages the connection relationship between the logical separation of the virtual PCI Express switches and the logical separation on the Ethernet 801 (the storing/updating of information representing the connection relationship, for example). Therefore, it is possible to provide a flat data communication environment that looks as if the virtual PCI Express switches are shared by all under the environment made up of a plurality of MRA extended PCI Express.

As shown in FIG. 15, the management module 3083 includes an own switch device information management circuit 30836, a device information transmission module 30837, an own switch device information table 30838, an own switch VS-VLAN information setting circuit 30839, an own/other device information output circuit 30835, an other switch device information table 30833, an other switch device information management circuit 30832, and a device information reception module (not shown).

The following describes how the management module 3083 functions using the VS-VLAN mapping table 30827, the own switch device information table 30838 and the other switch device information table 30833.

The VS-VLAN mapping table 30827 is set by the own switch VS-VLAN information setting circuit 30839. The own switch VS-VLAN information setting circuit 30839 acquires (extracts) the information of the setting register 3050 managed by the MRA controller logic unit 3049 managed by the MR-PCIM 52. Incidentally, the setting register is set in accordance with a similar setting operation to the setting operation disclosed in NPL 1.

FIG. 17 is an explanatory diagram illustrating an example of the setting information of the setting register 3050 of the MRA extended PCI Express switch 304. FIG. 18 is an explanatory diagram illustrating an example of the setting information of the setting register 3087 of the MRA extended PCI Express switch 308.

In the example shown in FIG. 17, a setting register 5141 is set so that the virtual PCI Express switches 1, 2 and 3 of the MRA extended PCI Express switch 304 are to be used. Thanks to the above settings, the own switch VS-VLAN information setting circuit 30839 makes a table to set VLAN information for the virtual PCI Express switches 1, 2 and 3. Incidentally, the VS-VLAN mapping table 30827-1 shown in FIG. 19 corresponds to an example of the setting of a table that sets the VLAN information. However, the VLAN numbers are set at 1, 2 and 2003 for the virtual PCI Express switches 1, 2 and 3.

In the example shown in FIG. 18, a setting register 5151 is set so that the virtual PCI Express switches 1 and 2 of the MRA extended PCI Express switch 308 are to be used. Thanks to the above settings, the own switch VS-VLAN information setting circuit 30839 makes a table to set VLAN information for the virtual PCI Express switches 1 and 2. Incidentally, the VS-VLAN mapping table 30827-5 shown in FIG. 20 corresponds to an example of the setting of a table that sets the VLAN information. However, the VLAN numbers are set at 2003 and 1 for the virtual PCI Express switches 1 and 2.

Incidentally, as for the process of determining the VLAN numbers, a system operator can determine and set in advance which VLAN is to be used to connect the virtual PCI Express switches. In this case, as for a method of setting the VLAN numbers, the same process is performed as in the case where the MR-PCIM 52 sets a MRA-PCI Express switch. That is, in order to logically keep a plurality of root complexes from existing, when the configuration is the virtual PCI Express switches (n)-VLANs (m)-virtual PCI Express switches (s), the setting is done so that there is only one connected root complex in a plurality of virtual PCI Express switches (n) and virtual PCI Express switches (s) being connected together.

The own switch device information table 30838 is set by the own switch device information management circuit 30836. The own switch device information management circuit 30836 acquires (extracts) the information of the setting register 3050 managed by the MRA controller logic unit 3049 managed by the MR-PCIM 52. Incidentally, the setting register is set in accordance with a similar setting operation to the setting operation disclosed in NPL1.

The own switch device information management circuit 30836 sets the virtual PCI Express switch numbers and the switch utilization port number/utilization VH number/UP-DN setting information of the own switch device information table 30838, on the basis of the virtual PCI Express switch numbers and the information of a list of the switch utilization port number/utilization VH number/UP-DN setting that uses the switch. The virtual PCI Express switch numbers and the information of a list of the switch utilization port number/utilization VH number/UP-DN setting that uses the switch are included in the setting register 3050.

In the example of the setting of the setting register 5141 shown in FIG. 17 in the MRA extended PCI Express switch 304, for the virtual PCI Express switch number 1, the following three ports are set: Port 1/VH0/UP, Port 3/VH0/DN, and Port 4/NA/DN. In this case, for the three pieces of port information, as in the settings of the own switch device information table 30383-2 shown in FIG. 24, the virtual PCI Express switch numbers are set to 1, and the pieces of utilization port number/utilization VH number/UP-DN information are stored. Similarly, the information is stored for all the other virtual PCI Express switch numbers and the port information being used. Since the information for a total of 7 ports is stored in the setting register 5141, the information for 7 items is also entered into the Own switch device information table 30383-2.

Then, the management module 3083 always sets a unique MAC address on a network for the item entered into the own switch device information table 30383. In the first item of the own switch device information table 30383-2, for the Port 11/VH0/UP of the virtual PCI Express switch number 1, the utilization MAC address "00-00-4c-01-01-01" is set. In order to set a unique MAC address, a port number inside the virtual PCI Express switch is set in the bits 0 to 7 of the MAC address. In the bits 8 to 15, the number of the virtual PCI Express switch is set. In the 16 to 23 bits, a number that is serially assigned for each MRA extended PCI Express switch is set. If the MAC addresses to be set are given in an orderly manner and uniquely set on the network as described above, the automatic setting of the MAC addresses may be carried out.

Figure 22:
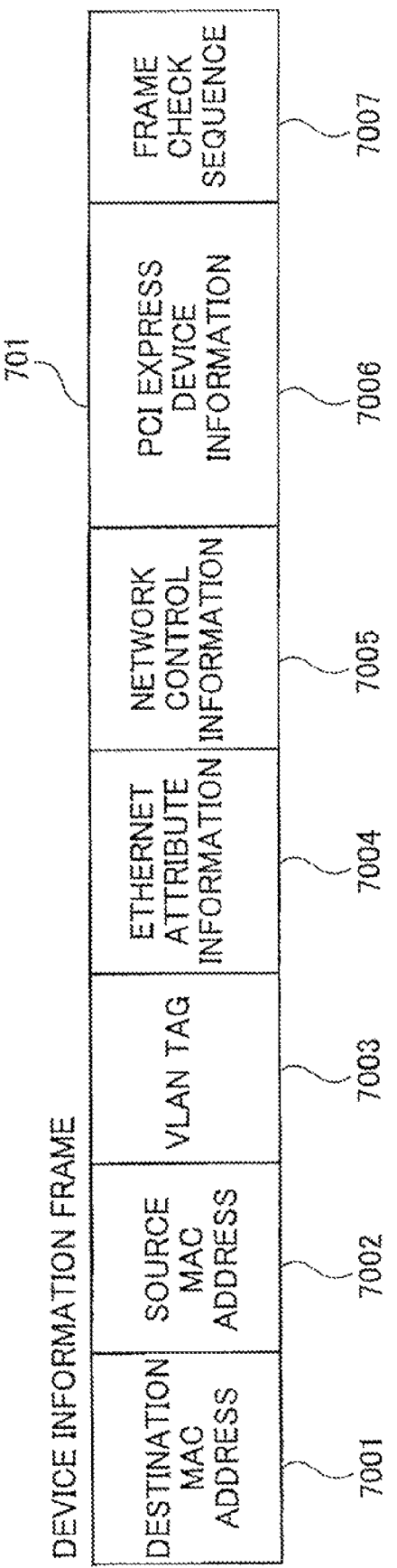

Then, as for the items entered into the own switch device information table 30838, in order to inform the other MRA extended PCI Express switch of the state of the configuration of the port of the own switch, an own switch device information management circuit 20836 regularly transmits the device information management frame 701 shown in FIG. 22 through the transmission frame control circuit 30822 via a network (at predetermined intervals, for example).

In the device information management frame 701, a broadcast address "FF-FF-FF-FF-FF-FF" is always set in the destination MAC address. The Ethernet attribute information 2004 of the device information management frame 701 represents the type of a frame of an Ethernet frame; a fixed value, which is determined by a standard or uniquely by a user, is stored. The present device information management frame 701 is used on the Ethernet 801 and in the reception frame analysis module 30824 to make a determination as to whether the frame is a device information management frame.

In the example of the setting of the own switch device information table 30838-2 shown in FIG. 24 in the MRA extended PCI Express switch 304, the information of the Port 1/VH0/UP of the virtual PCI Express switch number 1 of the first item is stored in PCI Express device information 7006. The utilization MAC address "00-00-4c-01-01-01" is stored in the source MAC address 7002.

Then, the management module 3083 stores the VLAN information corresponding to the virtual PCI Express switch in a similar way to the storage method of the VLAN tag 2003 of FIG. 21. For example, in the VS-VLAN mapping table 30827-1 shown in FIG. 19, the VLAN corresponding to the virtual PCI Express switch number 1 is 1. Therefore, 1 is used as the VLAN. Accordingly, when the present device information frame is transmitted from the transmission frame control circuit 3082 through the Ethernet 801, a broadcast transfer process is performed on the VLAN 1 of the Ethernet 801. Therefore, the present device information frame is transferred to all the MRA extended PCI Express switches being connected to the Ethernet 801. The transferred frame is received by the reception frame control circuit 30823 of each MRA extended PCI Express switch. The reception frame analysis module 30824 recognizes the transferred frame as the device information frame 701. As a result, the frame is transferred to the other switch device information management circuit 30832 inside the management module 3083 where the frame is used to create the other switch device information table 30833.

In the example of the setting of the own switch device information table 30838-1 shown in FIG. 23 in the MRA extended PCI Express switch 304, the switch utilization MAC address "00-00-4c-01-00-00" is stored in the source MAC address 702. Then, "0" is used as a VLAN tag and PCI Express device information. The frame is different from a device information frame generated by the above own switch device information table 30838-2 and is used only for transmission of a switch utilization MAC address with the use of the VLAN 0. Accordingly, when the present device information frame is transmitted from the transmission frame control circuit 30822 through the Ethernet 801, a broadcast transfer process is performed on the VLAN 0 of the Ethernet 801. Therefore, the present device information frame is transferred to all the MRA extended PCI Express switches being connected to the Ethernet 801. The transferred frame is received by the reception frame control circuit 30823 of each MRA extended PCI Express switch. The reception frame analysis module 30824 recognizes the transferred frame as the device information frame 701. As a result, the frame is transferred to the other switch device information management circuit 30832 inside the management module 3083 where the frame is used to create the other switch device information table 30833.

The other switch device information table 30833 is set by the other switch device information management circuit 30832. Incidentally, the other switch device information management circuit 30832 acquires (inputs) from the reception frame analysis module 30824 the device information frame 701 transmitted from the own switch device information management circuit 30836 of the other MRA extended PCI Express switch described above.

The other switch device information management circuit 30832 acquires (extracts) from the device information frame 702 the virtual PCI Express switch numbers, the switch utilization port number/utilization VH number/UP-DN setting information, and the utilization MAC address of the other switch device information table 30833. The VLAN tag 7003, or VLAN, is converted into a virtual PCI Express switch number in accordance with the information of the VS-VLAN mapping table 30827 and the virtual PCI Express switch number is stored. As for the switch utilization port number/ utilization VH number/UP-DN setting information, the virtual PCI Express switch number stored in the PCI Express device information 7006 and the switch utilization port number/utilization VH number/UP-DN setting information that uses the switch are stored without changes. As for the utilization MAC address, the source MAC address 7002 is stored without changes.

Thanks to the above operation, the other switch device information table 30833 can be set on the basis of the device information frame transmitted from the other MRA extended PCI Express switch.

In the example of the setting of the own switch device information table 30838-2 shown in FIG. 24 in the MRA extended PCI Express switch 304, Port 1/VH0/UP and "00-00-4c-01-01-01" are stored for the virtual PCI Express switch number 1 of the item 1. Therefore, the MRA extended PCI Express switch 304 transmits, as the device information frame 701, a frame including the destination MAC address "FF-FF-FF-FF-FF-FF," the source address "00-00-4c-01-01-01," VLAN tag "1," and PCI Express device information "Port 1/VH0/UP."

After receiving the present device information frame, the MRA extended PCI Express switch 308 stores the virtual PCI Express switch number as in the item 1 shown in the other switch device information table 30833-52 shown in FIG. 30. In this case, the MRA extended PCI Express switch 308 uses the VS-VLAN mapping table 30827-5 shown in FIG. 20 to store "2" as a virtual PCI Express switch number for the VLAN "1." As for the switch utilization port number, utilization VH number and UP-DN setting, the Port 1/VH0/UP of the PCI Express device information is stored. As for the utilization MAC address, the source address "00-00-4c-01-01-01" is stored.

In the example of the setting of the own switch device information table 30838-1 shown in FIG. 23 in the MRA extended PCI Express switch 304, as the switch utilization MAC address "00-00-4c-01-00-00," only the source MAC address 7002 is stored. Therefore, the MRA extended PCI Express switch 304 transmits, as the device information frame 701, a frame including the destination MAC address "FF-FF-FF-FF-FF-FF," the source address "00-00-4c-01-00-00," VLAN tag "0," and PCI express device information "0."

After receiving the present device information frame, the MRA extended PCI Express switch 308 stores, as the destination (to-be-connected) switch MAC address, the source address "00-00-4c-01-01-01" as in the item 1 shown in the other switch device information table 30833-51 shown in FIG. 29. Entry numbers are set in the items for switch of the present other switch device information table 30833-51. In this case, after receiving the device information frames from the other switches, the entry numbers, calculated by "(the number of the MRA extended PCI Express switches that exist on a network)—1," are sequentially set in the order 2, 3, . . . . The destination switch MAC addresses corresponding to the number of the entries are set on the basis of the device information frame 701 that is made up of VLAN tag "0" and PCI Express device information "0."

As described above, according to the present embodiment, the MRA extended PCI Express switches 304 and 308 figure out the device information of each other by exchanging the device information frame on the network. Moreover, it is possible to transfer data from a virtual PCI Express switch to a virtual PCI Express switch of the other MRA extended PCI Express switch through the network control circuit and the Ethernet 801, not through the PCI-PCI bridge.

According to the present embodiment, the MRA extended PCI Express switch 304 operates in accordance with the setting examples of: the setting register 5141 of FIG. 17, the VS-VLAN mapping table 30827-1 of FIG. 19, the own switch device information table 30838-1 of FIG. 23, and the own switch device information table 30838-2 of FIG. 24. The MRA extended PCI Express switch 308 operates in accordance with the setting examples of: the setting register 5151 of FIG. 18, the VS-VLAN mapping table 30827-5 of FIG. 20, the own switch device information table 30838-51 of FIG. 27, and the own switch device information table 30838-52 of FIG. 28. Then, in accordance with the operation described above, the device information frame is transmitted and received through the Ethernet (Registered Trademark) 801 thanks to the operations of the management module 3042 and the network control circuit 3042.

Thanks to the above operations, according to the present embodiment, in the MRA extended PCI Express switch 304, the other switch device information table 30833-1 of FIG. 25 and the other switch device information table 30833-2 of FIG. 26 are automatically made.

Similarly, in the MRA extended PCI Express switch 308, the other switch device information table 30833-51 of FIG. 29 and the other switch device information table 30833-52 of FIG. 30 are automatically made. Thus, it is possible for the MRA extended PCI Express switches 304 and 308 to transfer data to a virtual PCI Express switch of the other MRA extended PCI Express switch through the Ethernet 801, not through the PCI-PCI bridge.

Figure 31:
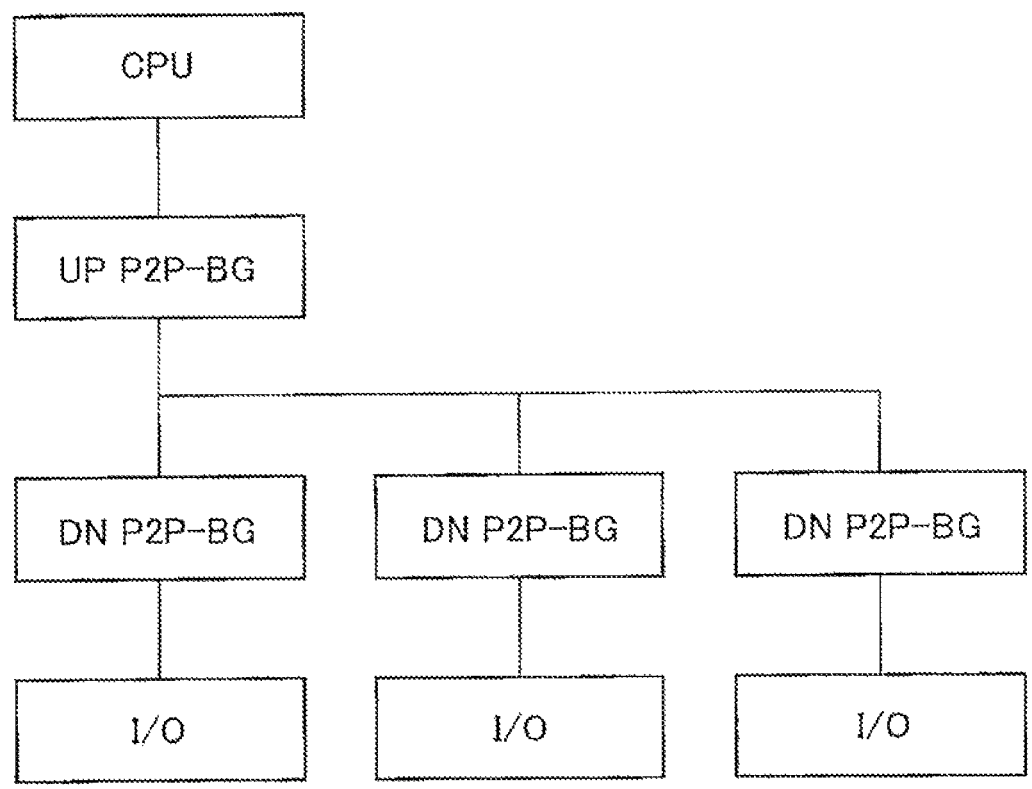
Figure 32:
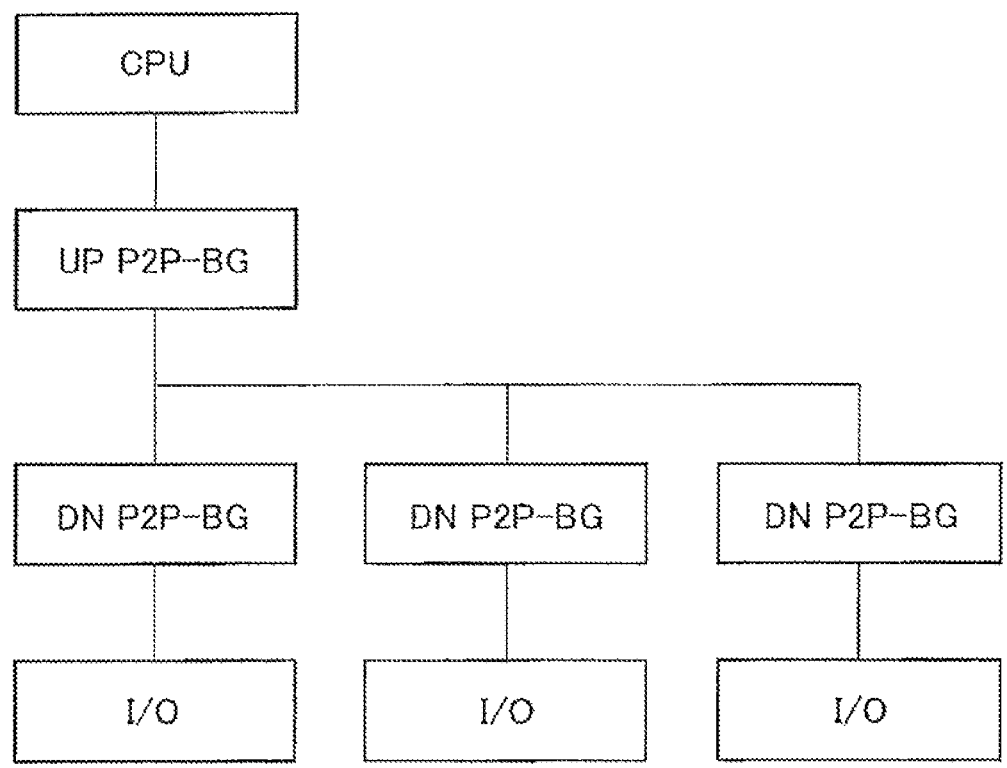

Thanks to the above settings, as for the CPU 101, the PCI tree shown in FIG. 31 is assembled for the I/O device. As for the CPU 1011, the PCI tree shown in FIG. 32 is assembled.

According to the present embodiment, the configuration of the MRA extended PCI Express switch is realized that requires one downstream PCI-PCI bridge to connect one I/O device at any time. Therefore, no PCI-PCI bridge is put in place in connecting switches: Thanks to the above configuration, no bridge is uselessly connected. Therefore, even if the number of I/O devices increases, it is possible to minimize the time needed to configure a PCI-PCI bridge. Thus, it takes less time to start the BIOS compared with the MRA-PCI Express switch disclosed in NPL1.

Moreover, according to the present embodiment, no PCI-PCI bridge is necessary to connect switches. Therefore, it is not necessary to set VH numbers between switches. Therefore, the number of the pieces of information managed by the MR-PCIM 52 can be reduced only to the number of I/O connections for each root complex at any time. Thus, it is possible to minimize the time required to initialize the MR-PCIM 52.

Furthermore, according to the present embodiment, particularly, in the process (specific process) of examining the topology of the switch during the initialization process of the MR-PCIM 52, the MRA extended PCI Express switches 304 and 308 turn out to be a tree of a one-stage PCI Express including one upstream bridge and downstream bridges, the number of which is equal to the number of I/O devices, for the root complex at any time. Therefore, it is possible to simplify the algorithm used to examine the topology of the switch of the MR-PCIM 52 as well as to reduce the initialization time. Accordingly, it is possible to improve the operational performance of the system in the system where the MR-PCIM 52 is used.

Moreover, according to the present embodiment, when the MR endpoint 506 is accessed from the CPU 101, the upstream/downstream PCI-PCI bridge 951225122, which is included in the MRA-PCI Express switch disclosed in NPL1, is unnecessary. Therefore, according to the present embodiment, the MRA extended PCI Express switches 304 and 308 can be formed using only a PCI-PCI bridge that works only in an upstream or downstream portion. Thus, it is possible to make the circuit of the PCI-PCI bridge simple.

Moreover, according to the present embodiment, even when two links are used to connect switches through the Ethernet 801, the two links are equivalent to a portion of the bus on the tree of PCI Express. Therefore, it is possible to prevent the tree of PCI Express from forming a loop structure and to form an appropriate tree of PCI express.

As described above, according to the present embodiment, when the number of I/O devices to be housed is increased with the use of the PCI Express switch that accommodates a plurality of root complexes and when switches are connected together in the configuration of a plurality of switches, it is possible to house the I/0 devices without passing through a PCI-PCI bridge as well as to prevent the increase of the BIOS start time.

That is, according to present embodiment, in addition to the building blocks of the MRA-PCI Express switch, the PCI Express switches 304 and 308 are equipped with a function of transferring to the Ethernet 801 outside the switches the data that is to be processed in each virtual PCI Express switch. The PCI Express switches 304 and 308 also link each virtual PCI Express switch to a virtual LAN (VLAN) on the Ethernet 801 when transferring to the external Ethernet 801 before transferring data to each VLAN. Therefore, it is possible to exchange (transmit and receive) data between the virtual PCI Express switches through the VLANs as well as to realize a function of connecting switches without passing through the PCI-PCI bridge when the switches are connected. Thus, when switches are connected in a PCI Express switch that houses a plurality of root complex systems, it is possible to accommodate I/O devices without passing through a PCI-PCI bridge and to reduce the increase of the BIOS start time.

Moreover, in a system that uses the PCI Express switch disclosed in PTL1 or PTL2, in a MRA-PCI Express switch, it is necessary to set VH numbers between switches of PCI-PCI bridges. Accordingly, as the number of I/O devices to be housed in the system increases, it is necessary to manage the connection links between the switches as well as the number of I/O devices to be connected for each root complex, resulting in an increase in the amount of information managed by a MR-PCIM. Therefore, the problem is that it takes more time to initialize the MR-PCIM. In this case, the MRA-PCI Express switch cannot set the ports at all that are connected to other root complexes to which the MR-PCIM is not connected until the MR-PCIM completes the initialization process (the process of examining the topology of switches and the connected devices). Thus, the longer initialization time means a serious deterioration of the system's operational performance.

According to the present embodiment, for the configuration of a plurality of switches in the MRA-PCI Express system, it is possible to prevent the increase of the management information of the MR-PCIM 52 and to reduce the time required to initialize the MR-PCIM 52.

That is, according to present embodiment, in addition to the building blocks of the MRA-PCI Express switch, the PCI Express switches 304 and 308 are equipped with a function of transferring to the Ethernet 801 outside the switches the data that is to be processed in each virtual PCI Express switch. The PCI Express switches 304 and 308 also link each virtual PCI Express switch to a virtual LAN (VLAN) on the Ethernet 801 when transferring to the external Ethernet 801 before transferring data to each VLAN. Therefore, it is possible to exchange (transmit and receive) data between the virtual PCI Express switches through the VLANs as well as to realize a function of connecting switches without passing through the PCI-PCI bridge when the switches are connected. Thus, it is possible to prevent the increase of the management information of the MR-PCIM 52 and to reduce the time required to initialize the MR-PCIM 52.

Moreover, in a system that uses the PCI Express switch disclosed in PTL1 or PTL2, if the system is made up of a plurality of MRA-PCI Express switches, it is necessary to operate both an upstream PCI-PCI bridge and a downstream PCI-PCI bridge among PCI-PCI bridges between the switches. Accordingly, the problem is that the use of the method disclosed in PTL1 or PTL2 makes the circuit of the PCI-PCI bridge more complex depending on in which portion, an upstream or downstream portion, the circuit is operated and makes the circuit large in size. Moreover, if there are two connection links between the switches, there is a fear that a loop structure may emerge depending on the upstream/downstream settings of the connection position and that an appropriate tree of PCI Express may not be made.

According to the present embodiment, without the need to support both the operations of the upstream/downstream PCI-PCI bridges, it is possible to form a MRA-PCI Express switch (a switch that accommodates a plurality of root complexes) capable of realizing the configuration of a plurality of switches and to make the circuits of the switches simple.

That is, according to present embodiment, in addition to the building blocks of the MRA-PCI Express switch, the PCI Express switches 304 and 308 are equipped with a function of transferring to the Ethernet (Registered Trademark) 801 outside the switches the data that is to be processed in each virtual PCI Express switch. The PCI Express switches 304 and 308 also link each virtual PCI Express switch to a virtual LAN (VLAN) on the Ethernet 801 when transferring to the external Ethernet 801 before transferring data to each VLAN. Therefore, it is possible to exchange (transmit and receive) data between the virtual PCI Express switches through the VLANs as well as to realize a function of connecting switches without passing through the PCI-PCI bridge when the switches are connected. Thus, without the need to support both the operations of the upstream/downstream PCI-PCI bridges, it is possible to form a MRA-PCI Express switch capable of realizing the configuration of a plurality of switches and to make the circuits of the switches simple.

Moreover, according to the present embodiment, for the configuration of a plurality of switches, when seen from the CPU, the tree structure of one-hop (one-stage) PCI Express switch is formed only by the upstream/downstream PCI-PCI bridge. Therefore, it is possible to prevent a loop structure from being formed. It is also possible to simplify the initialization process (the process of examining the topology of switches and devices) of the MR-PCIM 52 as well as to reduce the time.

That is, according to present embodiment, in addition to the building blocks of the MRA-PCI Express switch, the PCI Express switches 304 and 308 are equipped with a function of transferring to the Ethernet 801 outside the switches the data that is to be processed in each virtual PCI Express switch. The PCI Express switches 304 and 308 also link each virtual PCI Express switch to a virtual LAN (VLAN) on the Ethernet 801 when transferring to the external Ethernet 801 before transferring data to each VLAN. Therefore, it is possible to exchange (transmit and receive) data between the virtual PCI Express switches through the VLANs as well as to realize a function of connecting switches without passing through the PCI-PCI bridge when the switches are connected. Thus, it is possible to form the structure of one-hop PCI Express switch that is made up only of the upstream/downstream PCI-PCI bridge when seen from the CPU.

Figure 33:
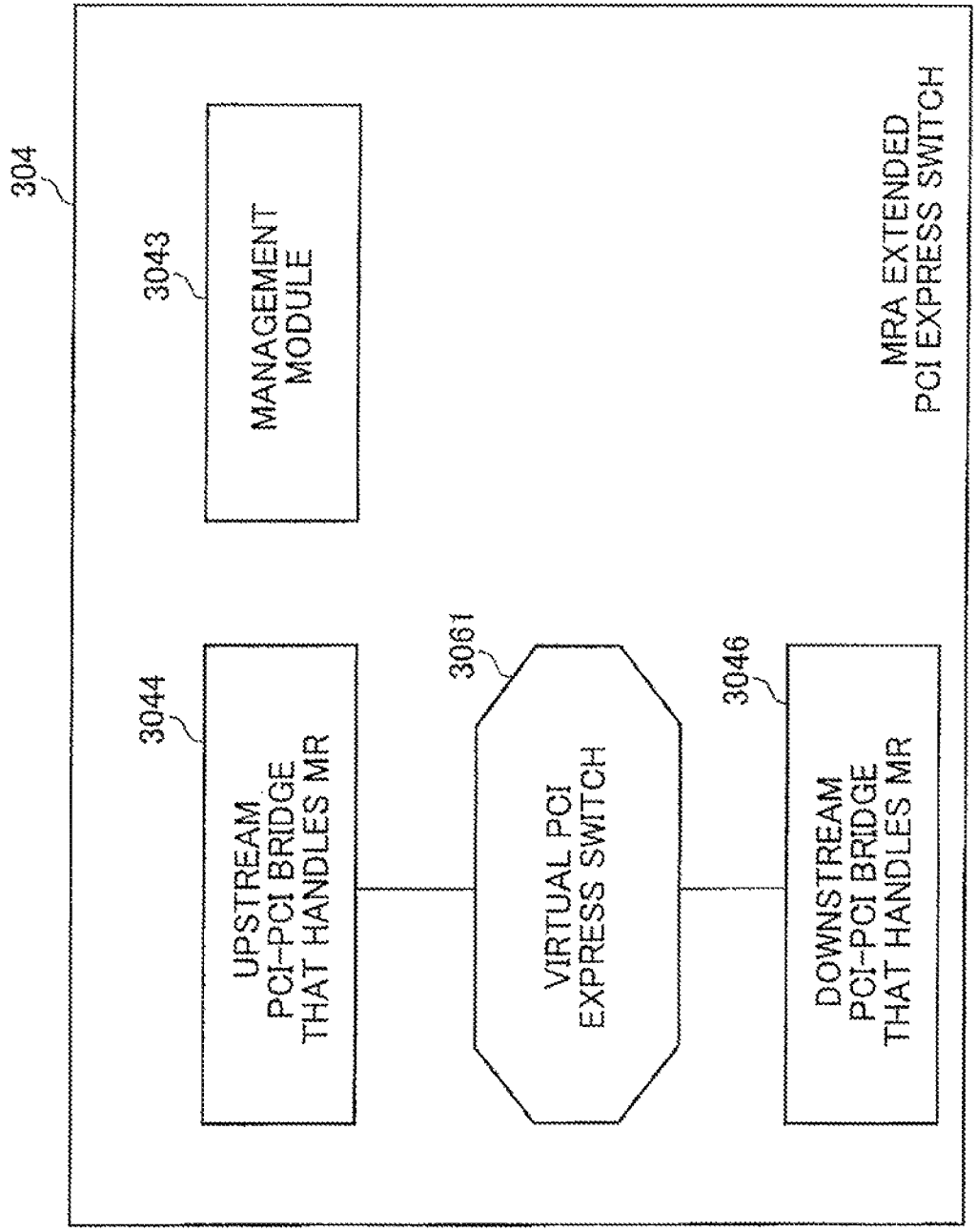

The following describes the minimum configuration of a PCI Express switch according to the present invention. FIG. 33 is a block diagram illustrating an example of the minimum configuration of a PCI Express switch. As shown in FIG. 33, the MRA extended PCI Express switch 304 includes at least the following building blocks: the PCI-PCI bridges 3044 and 3046 that handle MR, the virtual PCI Express switch 3061 and the management module 3043.

The PCI-PCI bridges 3044 and 3046 that handle MR are PCI-PCI bridges that handle Multi Root to connect to a plurality of root complexes. The virtual PCI Express switch. 3061 is equipped with a function of performing a switching process between the PCI-PCI bridges 3044 and 3046 that handle MR. The management module 3043 is equipped with a function of transferring the following data to an external switch through a network, not through the PCI-PCI bridges 3044 and 3046 that handle MR: the data that is to be processed in the virtual PCI Express switch 3061.

According to the PCI Express switch having the minimum configuration shown in FIG. 33, when the switches are connected in the PCI Express switch that houses a plurality of root complexes, it is possible to accommodate the I/O devices without passing through the PCI-PCI bridges. It is also possible to reduce the increase of the BIOS start time.

Incidentally, in the embodiment described above, the characteristic configurations of the PCI Express switch and the PCI Express system, such as those described below in (1) to (8), are shown.

(1) A PCI Express switch includes: PCI-PCI bridges (which are for example realized by the upstream PCI-PCI bridges 3044 and 3045 that handle MR, the downstream PCI-PCI bridges 3046, 3047 and 3048 that handle MR) that handle Multi Root to connect to a plurality of root complexes; virtual PCI Express switches (which are for example realized by the virtual PCI Express switches 3061, 3062, 3063 and 3064) that perform a switching process between the PCI-PCI bridges; and network control means (which is for example realized by the management module 3043) for transferring data that is to be processed in the virtual PCI Express switches to an external switch through a network without passing through a PCI-PCI bridge.

(2) The PCI Express switch may be configured so that the network control means transfers the data that is to be processed in the virtual PCI Express switches to an external switch through Ethernet (Registered Trademark).

(3) The PCI Express switch may be configured so that the network control means transfers the data that is to be processed in the virtual PCI Express switches to an external switch through Ethernet (Registered Trademark), the network control means has a table (which is for example realized by the other switch device information table 30833, or the own switch device information table 30838) to manage, for each virtual PCI Express switch, VLANs that are used to transfer data, and the network control means uses the table to transfer data.

(4) The PCI Express switch may be configured so that the network control means includes an external switch table (which is for example realized by the other switch device information table 30833) to manage setting information of a virtual PCI Express switch and of the PCI-PCI bridges of the external switch; and the network control means transfers data using the external switch table.

(5) The PCI Express switch may be configured so that the network control means includes an own switch table (which is for example realized by the own switch device information table 30838) to manage setting information of a virtual PCI Express switch of an own switch and of the PCI-PCI bridges; and the network control means transfers data using the own switch table.

(6) The PCI Express switch may be configured so that the network control means includes an own switch table (which is for example realized by the own switch device information table 30838) to manage setting information of the virtual PCI Express switch of an own switch and of the PCI-PCI bridges; and the network control means informs the external switch of the setting information of the own switch at predetermined intervals in accordance with the information of the own switch table.

(7) The PCI Express switch may be configured so that the network control means receives the setting information of the virtual PCI Express switch of the external switch and of the PCI-PCI bridges, the network control means includes an external switch table (which is for example realized by the other switch device information table 30833) to manage the setting information of the virtual PCI Express switch of the external switch and of the PCI-PCI bridges, and the network control means automatically updates the external switch table on the basis of the setting information received from the external switch.

(8) A PCI Express system includes a first PCI Express switch (which is for example the MRA extended PCI Express switch 304) and a second PCI Express switch (which is for example the MRA extended PCI Express switch 308), wherein the first PCI Express switch includes: PCI-PCI bridges (which are for example realized by the upstream PCI-PCI bridges 3044 and 3045 that handle MR, or the downstream PCI-PCI bridges 3046, 3047 and 3048 that handle MR) that handle Multi Root to connect to a plurality of root complexes; virtual PCI Express switches (which are for example realized by the virtual PCI Express switches 3061, 3062, 3063 and 3064) that perform a switching process between the PCI-PCI bridges; and network control means (which is for example realized by the management module 3043) for transferring data that is to be processed in the virtual PCI Express switches to the second PCI Express switch through a network without passing through a PCI-PCI bridge.

The above has described the exemplary embodiments of the present invention. However, the present invention may be embodied in other various forms without departing from the spirit and essential characteristics defined by the appended claims. The embodiments described above are therefore to be considered only as illustrative, not as restrictive. The scope of the invention is indicated by the appended claims, not by the specification or abstract. Furthermore, all modifications and alterations which come within the meaning and range of equivalency of the claims are to be embraced within the scope of the present invention.

INDUSTRIAL APPLICABILITY

The present invention can be applied to a computer system or network system connected through wires. The present invention can also be applied to all system environments where a PCI Express interface is mounted regardless of wired or wireless connections.

REFERENCE SIGNS LIST

52: MR-PCIM
101, 108, 1011: CPU
102, 109, 1021: Root complex
103, 110, 1031: Memory
106, 107: Endpoint
304, 308: MRA extended PCI Express switch
505, 506: MR Endpoint
3042, 3082: Network control circuit
3043, 3083: Management module
3044: Upstream PCI-PCI bridge that handles MR
3045, 3084: Upstream PCI-PCI bridge
3046, 3085: Downstream PCI-PCI bridge that handles MR
3047, 3048: Downstream PCI-PCI bridge
3049, 3086: MRA controller logic
3050, 3087: Setting register
3061, 3062, 3063, 3064, 3088, 3089, 3090: Virtual PCI Express switch
20091: Transmission network frame
20092: Reception network frame
30822: Transmission frame control circuit
30823: Reception frame control circuit
30824: Reception frame analysis module
30826: PCIe frame generation circuit
30827: VS-VLAN mapping table
30828: Own/other device information
30829: Network frame generation circuit
30832: Other switch device information management circuit
30833: Other switch device information table
30835: Own/other device information output circuit
30836: Own switch device information management circuit
30839: Own switch VS-VLAN information setting circuit

The invention claimed is:
1. A PCI Express switch comprising:
a first PCI-PCI bridge handling a Multi Root;
a second PCI-PCI bridge;
a virtual PCI Express switch that performs a switching process between the first and second PCI-PCI bridges; and
a network control device connected to the virtual PCI Express switch,
the first PCI-PCI bridge being connected to a plurality of root complexes,
the second PCI-PCI bridge being connected to an endpoint,
the network control device being connected to an external switch through an external network and being configured to transfer data that is to be processed in the virtual PCI Express switch to the external switch through the external network,
wherein the plurality of root complexes, the endpoint, the external switch, and the external network are outside of the PCI Express switch.
2. The PCI Express switch according to claim 1, wherein the external network is Ethernet.
3. The PCI Express switch according to claim 1, wherein:
the external network is Ethernet;
the network control device has a table to manage, for the virtual PCI Express switch, a VLAN that is used to transfer the data; and
the network control device uses the table to transfer the data.
4. The PCI Express switch according to claim 1, wherein:
the network control device includes a switch table to manage setting information of the virtual PCI Express switch and the first and second PCI-PCI bridges, and
the network control device transfers the data using the switch table.
5. The PCI Express switch according to claim 1, wherein:
the network control device includes a switch table to manage setting information of the virtual PCI Express switch and the first and second PCI-PCI bridges, and the network control device informs the external switch of the setting information of the virtual PCI Express switch and the first and second PCI-PCI bridges at predetermined intervals.

6. The PCI Express switch according to claim 1, wherein the external switch is another PCI Express switch.

7. The PCI Express switch according to claim 6, wherein:
the external switch includes a virtual PCI Express switch and PCI-PCI bridges,
the network control device includes an external switch table to manage setting information of the virtual PCI Express switch and the PCI-PCI bridges of the external switch; and
the network control device transfers the data using the external switch table.

8. The PCI Express switch according to claim 6, wherein:
the external switch includes a virtual PCI Express switch and PCI-PCI bridges,
the network control device receives setting information of the virtual PCI Express switch and the PCI-PCI bridges of the external switch;
the network control device includes an external switch table to manage the setting information; and
the network control device automatically updates the external switch table on the basis of the setting information.

9. A PCI Express system comprising
a first PCI Express switch and a second PCI Express switch,
the first PCI Express switch including:
a first PCI-PCI bridge handling a Multi Root;
a second PCI-PCI bridge;
a virtual PCI Express switch that performs a switching process between the first and second PCI-PCI bridges; and
a network control device connected to the virtual PCI Express switch,
the first PCI-PCI bridge being connected to a plurality of root complexes,
the second PCI-PCI bridge being connected to an endpoint,
the network control device being connected to external switch ugh an external network and being configured to transfer data that is to be processed in the virtual PCI Express switch to the external switch through the external network,
wherein the plurality of root complexes, the endpoint, the second PCI Express switch, and the external network are outside of the first PCI Express switch.

10. The PCI Express system according to claim 9, wherein the external network is Ethernet.

11. The PCI Express system according to claim 9, wherein:
the external network is Ethernet;
the network control device has a table to manage, for the virtual PCI Express switch, a VLAN that is used to transfer the data; and
the network control device uses the table to transfer the data.

12. The PCI Express system according to claim 9, wherein:
the network control device includes a switch table to manage setting information of the virtual PCI Express switch and the first and second PCI-PCI bridges of the first PCI Express switch, and
the network control device transfers the data using the switch table.

13. The PCI Express system according to claim 9, wherein:
the network control device includes a first switch table to manage setting information of the virtual PCI Express switch and the first and second PCI-PCI bridges of the first PCI Express switch; and
the network control device informs the second PCI Express switch of the setting information of the virtual PCI Express switch and the first and second PCI-PCI bridges of the first PCI Express switch at predetermined intervals.

14. The PCI Express system according to claim 9, wherein:
the second PCI Express switch includes a virtual PCI Express switch and PCI-PCI bridges,
the network control device includes an external switch table to manage setting information of the virtual PCI Express switch and the PCI-PCI bridges of the second PCI Express switch; and
the network control device transfers the data using the external switch table.

15. The PCI Express system according to claim 13, wherein:
the second PCI Express switch receives the setting information of the virtual PCI Express switch and the first and second PCI-PCI bridges of the first PCI Express switch;
the second PCI Express switch includes a second switch table to manage the setting information of the virtual PCI Express switch and the first and second PCI-PCI bridges of the first PCI Express switch; and
the second PCI Express switch automatically updates the second switch table on the basis of the setting information.

16. A network control method comprising the steps of:
processing data in a virtual PCI Express switch of a first PCI Express switch; and
transferring the data to a second PCI Express switch through an external network,
the first PCI Express switch including:
a first PCI-PCI bridge handling Multi Root;
a second PCI-PCI bridge; and
the virtual PCI Express switch that performs a switching process between the first and second PCI-PCI bridges,
the first PCI-PCI bridge being connected to a plurality of root complexes,
the second PCI-PCI bridge being connected to an endpoint,
wherein the plurality of root complexes, the endpoint, the second PCI Express switch and the external network are outside of the first PCI Express switch.

17. The network control method according to claim 16, wherein the external networks is Ethernet.

* * * * *